US008341120B2

(12) United States Patent
Barton et al.

(10) Patent No.: US 8,341,120 B2
(45) Date of Patent: Dec. 25, 2012

(54) APPARATUS AND METHODS FOR TRANSFERRING DATABASE OBJECTS INTO AND OUT OF DATABASE SYSTEMS

(75) Inventors: Lee B. Barton, Winchester, MA (US); George H. Claborn, Amherst, NH (US); William Fisher, Hollis, NH (US); James Stenoish, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2307 days.

(21) Appl. No.: 10/656,525

(22) Filed: Sep. 5, 2003

(65) Prior Publication Data

US 2005/0055351 A1 Mar. 10, 2005

(51) Int. Cl.
*G06F 7/00* (2006.01)
*G06F 17/00* (2006.01)

(52) U.S. Cl. ........................................ 707/640; 707/653

(58) Field of Classification Search ........................ None
See application file for complete search history.

(56) References Cited

U.S. PATENT DOCUMENTS

| | | | | |
|---|---|---|---|---|
| 5,752,027 | A * | 5/1998 | Familiar | 707/103 R |
| 6,032,159 | A * | 2/2000 | Rivlin | 707/204 |
| 6,047,291 | A * | 4/2000 | Anderson et al. | 707/103 R |
| 6,078,925 | A * | 6/2000 | Anderson et al. | 707/103 R |
| 6,405,198 | B1 * | 6/2002 | Bitar et al. | 707/6 |
| 6,463,442 | B1 * | 10/2002 | Bent et al. | 707/103 R |
| 6,665,677 | B1 * | 12/2003 | Wotring et al. | 707/100 |
| 6,993,529 | B1 * | 1/2006 | Basko et al. | 707/100 |
| 2001/0027453 | A1 * | 10/2001 | Suto | 707/10 |
| 2004/0064487 | A1 * | 4/2004 | Nguyen et al. | 707/204 |
| 2004/0153459 | A1 * | 8/2004 | Whitten et al. | 707/10 |
| 2005/0010919 | A1 * | 1/2005 | Ramanathan et al. | 717/174 |

OTHER PUBLICATIONS

Oracle 9i Database Documentation, Release 2 [9.2], Mar. 2002.*
U.S. Appl. No. 09/672,914, Clabom, et al.
U.S. Appl. No. 10/014,038, Lee B. Barton.
"Oracle 9i Database Reference" Release 2, Mar. 2002,Part No. A96652-01, Oracle Corp.

* cited by examiner

*Primary Examiner* — Jay Morrison
(74) *Attorney, Agent, or Firm* — Vista IP Law Group, LLP

(57) ABSTRACT

Techniques for transferring objects between database systems. A transfer is controlled by a master table in the RDBMS that is performing the transfer operation. The master table specifies the kind of transfer operation to be performed, a set of objects to be transferred, operations to be performed on the objects as they are being transferred, and filters for selecting a subset of the objects. During execution of the transfer, the transfer mechanism maintains and updates state in the master table and thereby makes it possible for the entity that is doing the transfer to determine the current status of the transfer and to restart the transfer after it has been stopped. The entity that is performing the transfer may also detach from the transfer without stopping the transfer and later again attach to the transfer.

58 Claims, 24 Drawing Sheets

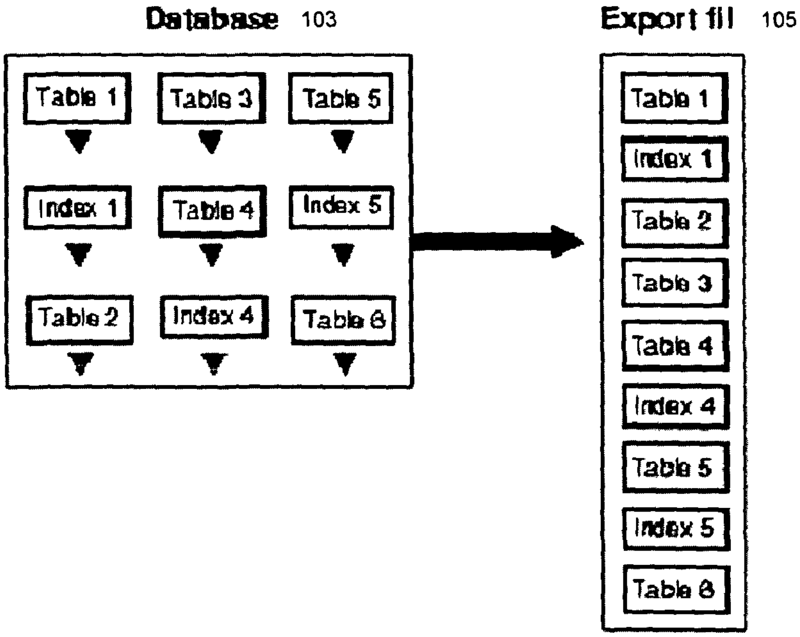
export 101
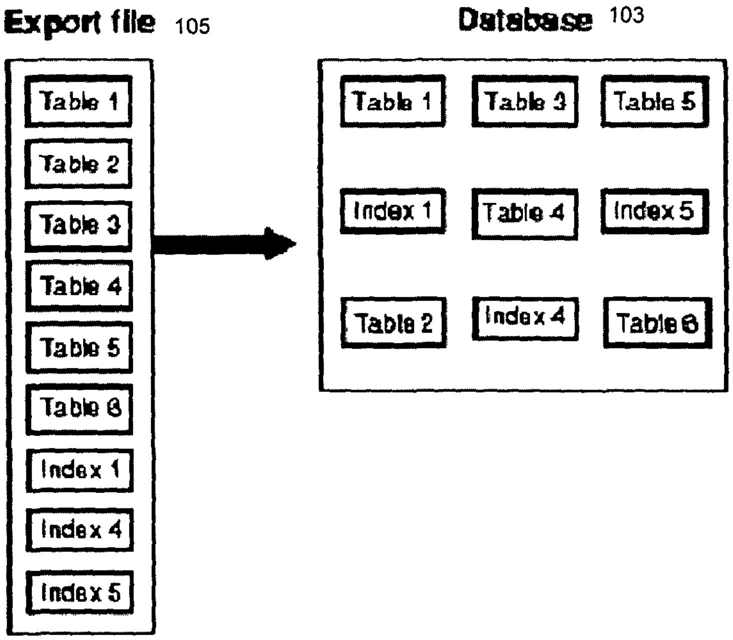
import 107
Fig. 1 PRIOR ART

401

| Column Name | Datatype | Meaning |
|---|---|---|
| PROCESS_ORDER | NUMBER | If >0, corresponding row describes an object processed by the job. The value of PROCESS_ORDER reflects the order in which the corresponding object must be imported in relation to other objects.<br>If <0, corresponding row describes an attribute of the job. The value of PROCESS_ORDER identifies which job attribute is being defined.<br>-71 is reserved as a pseudo OBJECT row to reference the Master Table at Export time.<br>-72 is reserved as a psuedo OBJECT row to reference the Master Table in Import/SQL file operations. |
| DUPLICATE | NUMBER | When multiple rows are needed to represent an object, DUPLICATE is used to define the order for them. The first row will have DUPLICATE set to 0 and succeeding rows will use 1 and up. If only a single row is used to identify an object, DUPLICATE will be set to 0. Multiple rows are used to identify all of the file pieces belonging to a partition. |
| DUMP_FILEID | NUMBER | The identification of the data representing this object in the dump set. Duplicate rows for the TABLE_DATA object row will specify the additional file pieces used for a table/partition. The identification requires four pieces of information:<br>The numeric id used to represent the file in the dump file set.<br>The block position of the data within the file.<br>The length of the data in bytes.<br>The total number of blocks allocated for the object. |
| DUMP_POSITION | NUMBER | |
| DUMP_LENGTH | NUMBER | |
| DUMP_ALLOCATION | NUMBER | |
| COMPLETED_ROWS | NUMBER | The number of rows that have been moved in the current file piece. (Used by GET_STATUS) |
| ERROR_COUNT | NUMBER | The number of errors detected in the current file piece. (Used by GET_STATUS) |
| ELAPSED_TIME | NUMBER | Amount of time spent processing file piece in 100ths of seconds. (Used by GET_STATUS) |
| OBJECT_TYPE_PATH | VARCHAR2(200) | Metadata API pathname for object as defined in the DATABASE_EXPORT_OBJECTS view. |
| OBJECT_PATH_SEQNO | NUMBER | Sequence number for object type. This field orders object types for import. |
| OBJECT_TYPE | VARCHAR2(30) | Simple object type name for object (without path info) |
| OBJECT_NAME | VARCHAR2(500) | Name of the object in the dump file set. For synonyms and java objects this may be the short name for the object. |
| LONG_OBJECT_NAME | VARCHAR2(4000) | Name of the object in the dump file set. |
| OBJECT_SCHEMA | VARCHAR2(30) | Schema owning the referenced object. NULL if object is not a schema object. For import, this schema may be changed due to schema remapping. |
| ORIGINAL_OBJECT_SCHEMA | VARCHAR2(30) | Schema owning the referenced object prior to any schema remaps. NULL if object is not a schema object. |
| FLAGS | NUMBER | X00000001 Unused<br>X00000002 has nested tables (valid only for TABLE objects)<br>X00000004 table is being repartitioned on import and partitions cannot be loaded in parallel (valid only for TABLE objects).<br>X00000008 Unused<br>X00000010 table uses row level security.<br>X00000020 table is a table used in a domain index<br>X00000040 object is partitioned<br>X00000080 table is a used as a nested table. |

503 (PROCESS_ORDER); 504 (DUPLICATE); 509, 1001 (DUMP_FILEID to DUMP_ALLOCATION); 513, 1003 (COMPLETED_ROWS to ELAPSED_TIME); 1005 (OBJECT_TYPE_PATH to ORIGINAL_OBJECT_SCHEMA); 511 (OBJECT_TYPE_PATH to FLAGS)

object row 507A

Fig. 10

| Ref. | Column | Type | Description |
|---|---|---|---|
| 513, 1101 | COMPLETION_TIME | DATE | (Import only) Timestamp entered when Import attempts to define the object. This timestamp may be used on restart to determine whether Import defined the object or whether the object was preexisting in the database before Import ran. |
| 511 | OBJECT_TABLESPACE | VARCHAR2(30) | Tablespace used to store the object if the object requires storage. |
| 511 | SIZE_ESTIMATE | NUMBER | Estimated size of TABLE_DATA object in bytes. During Import, DUMP_LENGTH is a more accurate measure of size. |
| 511 | OBJECT_ROW | NUMBER | Index into the XML document for the current object. This field is used when multiple objects are defined in a single XML document. This column is not used for TABLE_DATA objects. |
| 513, 1103 | IN_PROGRESS | CHAR(1) | *(Used in Import and Network only) If "T", indicates that the* creation of the current object was partially defined and may require special cleanup on restart. |
| 511 | PARTITION_NAME | VARCHAR2(30) | For TABLE_DATA objects, identifies the (sub)partition that contains the set of rows. Set to NULL otherwise. |
| 513 | PROCESSING_STATE | CHAR(1) | E-> Object definition has not been retrieved from source database.<br>R-> Object definition has been completely retrieved from source database. For Export, object has also been written to dump file set.<br>U-> Object has been read from source database, but its state is unknown (i.e., "in progress") in the target database.<br>W-> Object has been written to the target database.<br>+ -> Intermediate state used when filtering an export master table for an import job.<br>- -> Intermediate state used when filtering an export master table for an import job. |
| 513 | PROCESSING_STATUS | CHAR(1) | C -> Object has been successfully processed up to the point indicated by PROCESSING_STATE. (Fast reload of domain indexes is only supported if the parent table has this status).<br>I -> Object has been processed up to the point indicated by PROCESS_STATE with warning messages (e.g., not all rows processed for a TABLE_DATA object).<br>D -> (Import, Network only) Object already exists in target database and TABLE_EXISTS_ACTION was set to SKIP or APPEND.<br>F -> A hard error has been detected in processing this object. |
| 511, 1104 | BASE_OBJECT_TYPE | VARCHAR2(30) | For dependent objects, identifies the parent of the object. NULL for top level objects. |
| 511, 1104 | BASE_OBJECT_NAME | VARCHAR2(30) | |
| 511, 1104 | BASE_OBJECT_SCHEMA | VARCHAR2(30) | |
| 511, 1105 | PARALLELIZATION | NUMBER | For TABLE_DATA objects, specifies the maximum parallelization recommended for the partition/table by the data layer. It may be decreased by the scheduler in the MCP during assignment to a worker on Export or Import if the parallelization cannot be supported by the job. |
| 511, 1107 | UNLOAD_METHOD | NUMBER | For TABLE_DATA objects, specifies unload/load method:<br>1 -> Direct Path or Network<br>2 -> External Table<br>4 -> Either method is acceptable<br>-1 -> Neither method is acceptable |
| 511, 1109 | GRANULES | NUMBER | Number of data granules within a file piece. A granule is unit of allocation inside of external table processing. |
| 511, 1111 | SCN | NUMBER | Identifies the consistent SCN for TABLE and TABLE_DATA objects when TABLE_CONSISTENCY is set or FLASHBACK is set or safe_scn is set. |

object row 507B

Fig. 11

511 — object row 507C

| | | | |
|---|---|---|---|
| 1201 | DOMAIN_INDEX | VARCHAR2(30) | If object is a secondary object, identifies the domain index that created the object. NULL otherwise. |
| 1201 | DOMAIN_INDEX_SCHEMA | VARCHAR2(30) | |
| 1202 | GRANTOR | VARCHAR2(30) | For grants, the schema that originally created the grant. |
| 1203 | XML_CLOB | CLOB | For Table objects, the XML representation of the metadata to recreate the object. Also used to load data for Table_data objects within the table. |

| | Column Name | Datatype | Meaning |
|---|---|---|---|
| 503 | PROCESS_ORDER | NUMBER | -1 for Export jobs. -2 for Import and SQL_File jobs. |
| 504 | DUPLICATE | NUMBER | 0 |
| 1207 | OBJECT_NAME | VARCHAR2(500) | Name of the job (should be the same as the table name) |
| 1207 | OBJECT_LONG_NAME | VARCHAR2(4000) | Name of the job (should be the same as the table name) |
| 1207 | USER_NAME | VARCHAR2(30) | Username who initiated operation. (This should be same name as the owner of the Master Table.) |
| 1207 | OPERATION | VARCHAR2(30) | One of the following values: EXPORT, IMPORT, SQL_FILE. |
| 1207 | JOB_MODE | VARCHAR2(30) | One of the following values: FULL, SCHEMA, TABLE, TABLESPACE, TRANSPORTABLE |
| 1207 | REMOTE_LINK | VARCHAR2(4000) | Network link used for job (Null if none). |
| | VERSION | NUMBER | Version control for Master Table format. |
| | DB_VERSION | VARCHAR2(30) | The version of the database objects for this operation. |
| 1213 | STATE | VARCHAR2(30) | One of the following values: DEFINING, EXECUTING, IDLING, STOPPING, STOPPED, WAITING, COMPLETING, COMPLETED. |
| | PHASE | NUMBER | The sequence position in the tasks to accomplish the job. The meaning of each number is dependent upon the operation being performed. |
| | GUID | RAW(16) | Globally unique identifier for describing the job. The GUID is used to label files as belonging to the job. |
| 1215 | START_TIME | DATE | Datetime when the job was OPENed. |
| | BLOCK_SIZE | NUMBER | ksfq block size used in job. This is also defined in the header of each dump file. |
| | METADATA_BUFFER_SIZE | NUMBER | number of blocks in a ksfq buffer for processing metadata |
| | DATA_BUFFER_SIZE | NUMBER | number of blocks in a ksfq buffer for processing data |
| 1217 | DEGREE | NUMBER | Number of worker processes that can be active at any time |
| 1219 | ERROR_COUNT | NUMBER | Number of errors reported for job |

job state row 1205A (517)

| | | |
|---|---|---|
| TOTAL_BYTES | NUMBER | For Export, estimated size of data in job.<br>For Import, size of data in job to be loaded. |
| PLATFORM | VARCHAR2(100) | Platform used for the Export/Import |
| INSTANCE | VARCHAR2(15) | Instance name that job is running upon (RAC only) |
| ABORT_STEP | NUMBER | Process_order number of Object row that will cause the job to abort. For testing purposes only. |
| SCN | NUMBER | The System Change Number passed to Logical Standby for all DDL creations. This is *not* the SCN used for TABLE DATA OBJECT rows; they each have their own. |
| OBJECT_TYPE_PATH | VARCHAR2(200) | Final termination message for job |
| OLD_VALUE | VARCHAR2(4000) | This is the opaque "cookie" returned to us by dbms internal safe_scn.need_scn during export and handed in during import & network. Used by Logical Standby /Streams |
| FLAGS | NUMBER | X00000001 Job is interesting for either streams or logical standby and the SCNs for tables need to be supplied via the safe_scn package. |

job state row 1205B (517)

| Column Name | Datatype | Meaning |
|---|---|---|
| PROCESS_ORDER | NUMBER | -3 for Export jobs. |
| DUPLICATE | NUMBER | 0 |
| SEED | NUMBER | Highest value of PROCESS_ORDER in Master Table. Originally set to 1 when Master Table is initially created. |

MAX_PROCESS_ORDER row 1303 (517)

| | Column Name | Datatype | Meaning |
|---|---|---|---|
| | PROCESS_ORDER | NUMBER | -5 for Export jobs.<br>-6 for Import and SQL File jobs. |
| 504 | DUPLICATE | NUMBER | The sequence number for each object type |
| | OBJECT_TYPE_PATH | VARCHAR2(200) | Path of object type whose processing has completed. |
| 1307 | OBJECT_PATH_SEQNO | NUMBER | Sequence number for object type. This field orders object types for import. |
| | COMPLETION_TIME | DATE | Time when processing of object was completed. |
| | COMPLETED_ROWS | NUMBER | The number of objects of current object path have been processed. |

TYPE_COMPLETION row 1305
(517)

Fig. 13

| | Column Name | Datatype | Meaning |
|---|---|---|---|
| 503 | PROCESS_ORDER | NUMBER | -21 for Export jobs.<br>-22 for Import and SQL File jobs. |
| 504 | DUPLICATE | NUMBER | Internal number assigned to each file as it is specified at export time. File references by OBJECT rows always use this number rather than the file name. |
| 1403 | FILE_TYPE | NUMBER | 0 if disk file. |
| 1405 | USER_DIRECTORY | VARCHAR2(4000) | Directory path used for dump file. |
| 1405 | USER_FILE_NAME | VARCHAR2(4000) | Original file name specified by user |
| 1405 | FILE_NAME | VARCHAR2(4000) | Fully resolved name (including path information) for file. |
| 1407 | FILE_MAX_SIZE | NUMBER | Maximum size for the file. 0 if file is extendable. |

FILE row 1401 (521)

| | Column Name | Datatype | Meaning |
|---|---|---|---|
| 503 | PROCESS_ORDER | NUMBER | -23 for Export jobs.<br>-24 for Import and SQL_File jobs. |
| 504 | DUPLICATE | NUMBER | Ordinal position for when this ADD_FILE was specified (used to maintain round robin ordering between wildcarded names). |
| 1411 | FILE_NAME | VARCHAR2(4000) | Template for filename including substitution variables. |
| 1413 | FILE_MAX_SIZE | NUMBER | Maximum size for the file. 0 if file is extendable. |
| 1415 | SEED | NUMBER | Last value used for resolving substitution variables. Each wildcard specification needs a unique number since ADD_FILEs can come in after the job has started. |
| 1417 | LAST_FILE | NUMBER | File number of last file resolved from this wildcard string. This column is used to identify where we are in the round robin expansion of wildcarded names. |

WILDCARD_FILE row 1409 (521)

Fig. 14

| | Column Name | Datatype | Meaning |
|---|---|---|---|
| 503 | PROCESS_ORDER | NUMBER | -41 for Export jobs.<br>-42 for Import and SQL_File jobs. |
| 504 | DUPLICATE | NUMBER | Internal Id for the worker process. |
| 1503 | PROCESS_NAME | VARCHAR2(30) | Process name for the worker process |
| 1505 | OBJECT_NUMBER | NUMBER | PROCESS_ORDER value for the object being processed by the worker process. |
| | OBJECT_SCHEMA | VARCHAR2(30) | The schema of the object being processed. Null if not in EXECUTING state or processing a non-schema object. |
| | OBJECT_NAME | VARCHAR2(500) | The name of the object being processed. Null if not in EXECUTING state or processing an unnamed object. |
| | OBJECT_LONG_NAME | VARCHAR2(4000) | The name of the object being processed. Null if not in EXECUTING state or processing an unnamed object. |
| | OBJECT_TYPE_PATH | VARCHAR2(200) | The object type pathname of the object being processed. Null if not in EXECUTING state. |
| | PARTITION_NAME | VARCHAR2(30) | The name of the partition of the object being processed. Only object within a partitioned table; Null otherwise. |
| 1507 | TOTAL_BYTES | NUMBER | Number of bytes within a TABLE_DATA object. On EXPORT, number may be a estimate. NULL if no estimate is available on object or if work is not processing a TABLE DATA object. |
| | COMPLETED_ROWS | NUMBER | Number of data rows written or read for current TABLE DATA object. For other objects, the number of objects of current object path have been processed. |
| | LAST_UPDATE | DATE | Time of last update for Worker row. Used to approximate the time of a crash during restart. |
| | WORK_ITEM | VARCHAR2(30) | Current work item being processed by Worker. NULL if worker is idle. Possible values are UNLOAD METADATA, UNLOAD DATA, LOAD METADATA, LOAD DATA, ESTIMATE JOB, SQL FILE JOB, RELEASE FILES, and EXITING |
| | STATE | VARCHAR2(30) | One of the following values: WORK_WAITING, FILE_WAITING, EXECUTING, MASTER.<br>WORK_WAITING -- worker is waiting for work from the Master Control Process.<br>FILE_WAITING -- worker is waiting for a file space from the Master Control Process.<br>EXECUTING -- worker is processing one or more objects. See OBJECT_NUMBER and OBJECT_ROWID columns for details.<br>MASTER -- Worker Process is either saving or restoring the Master Table to/from the dump file set. |
| 1509 | METADATA_IO | NUMBER | Amount of Metadata written to the dump file (for export) or read from the dump file (for Import) or transferred over the link since last restart for this Worker. |
| | DATA_IO | NUMBER | Amount of table data written to the dump file (for Export) or read from the dump file (for Import) or transferred over the link since last restart for this Worker. |
| | CUMULATIVE_TIME | NUMBER | The amount of time that this worker process has spent actively processing the job. |

WORKER row 1501 (517)

Fig. 15

| Ref. | Column Name | Datatype | Meaning |
|---|---|---|---|
| 503 | PROCESS_ORDER | NUMBER | -7 for Export jobs. -8 for Import and SQL_File jobs. |
| 504 | DUPLICATE | NUMBER | 0 |
| 1603 | METADATA_IO | NUMBER | Amount of Metadata written to the dump file (for export) or read from the dump file (for Import) or transferred over the link (for Import over a network). |
| 1603 | DATA_IO | NUMBER | Amount of table data written to the dump file (for Export) or read from the dump file (for Import) or transferred over the link (for Import over a network). |
| 1603 | TOTAL_BYTES | NUMBER | An estimate of the total size of the job. For Import from files, the total size of the requested data within the dump file. |
| 1603 | CUMULATIVE_TIME | NUMBER | Sum of the amount of time that each worker process has spent actively processing the job in hundredths of a second. If 3 workers were active for an hour, this column would contain 1080000. |

RESTART_STATUS row 1601 (517)

| Ref. | Column Name | Datatype | Meaning |
|---|---|---|---|
| 503 | PROCESS_ORDER | NUMBER | -9 for Export jobs. -10 for Import jobs. |
| 504 | DUPLICATE | NUMBER | Unique key assigned to each (re)start of the job. The first start of a job will be represented by DUPLICATE 0. |
| 1605 | METADATA_IO | NUMBER | Bytes of Metadata written to the dump file (for export) or read from the dump file (for Import) or transferred over the link (for Network). |
| 1605 | DATA_IO | NUMBER | Bytes of table data written to the dump file (for Export) or read from the dump file (for Import) or transferred over the link (for Network). |
| 1605 | TOTAL_BYTES | NUMBER | For Export and Network, an estimate of the total size of the Operation (if available). For Import, the total size of the requested data within the dump file. |
| 1606 | ERROR_COUNT | NUMBER | Number of errors reported for job |
| 1605 | CUMULATIVE_TIME | NUMBER | Sum of the amount of time that each worker process has spent actively processing the job. If 3 workers were active for an hour, this column would contain 1080000. Using DATA_IO, TOTAL_BYTES, CUMULATIVE_TIME, and JOB_STATE.DEGREE, an estimate of the remaining time for the job will be possible. |
| 1607 | OBJECT_TYPE_PATH | VARCHAR2(200) | Final termination message from previous job incarnation. |
| 1607 | ELAPSED_TIME | NUMBER | Amount of time that elapsed between the restart and the latest timestamp found on the next restart in 100ths of seconds |
| 1607 | START_TIME | DATE | Starting time for previous incarnation of job. |
| 1607 | PLATFORM | VARCHAR2(100) | Platform used during previous incarnation of job. |
| 1607 | INSTANCE | VARCHAR2(15) | Instance name that job incarnation ran upon (RAC only) |
| 1607 | DEGREE | NUMBER | Degree of parallelism at end of previous incarnation of job. |

RESTART row 1605 (519)

Fig. 16

| Ref. | Column Name | Datatype | Meaning |
|---|---|---|---|
| 503 | PROCESS_ORDER | NUMBER | -51 for Export jobs.<br>-52 for Import and SQL_File jobs. |
| 504 | DUPLICATE | NUMBER | Internal Id for distinguishing Data Filters |
| 1703 | NAME | VARCHAR2(30) | Name of filter. |
| 1703 / 1705 | VALUE_T | VARCHAR2(4000) | Definition of a text filter. |
| 1703 / 1707 | VALUE_N | NUMBER | Definition of a numerical filter. |
| 1703 | OBJECT_SCHEMA | VARCHAR2(30) | Schema of table to which filter applies |
| 1703 | OBJECT_NAME | VARCHAR2(30) | Table for which filter applies |

DATA_FILTER row 1701 (523)

| Ref. | Column Name | Datatype | Meaning |
|---|---|---|---|
| 503 | PROCESS_ORDER | NUMBER | -53 for Export jobs.<br>-54 for Import and SQL_File jobs. |
| 504 | DUPLICATE | NUMBER | Internal Id for distinguishing Metadata Filters |
| 1711 | NAME | VARCHAR2(30) | Name of filter. |
| 1711 / 1713 | VALUE_T | VARCHAR2(4000) | Definition of filter |
| 1711 | OBJECT_TYPE_PATH | VARCHAR2(200) | Object class affected by the filter. If NULL, the filter affects all object classes. |

METADATA_FILTER row 1709 (523)

| Ref. | Column Name | Datatype | Meaning |
|---|---|---|---|
| 503 | PROCESS_ORDER | NUMBER | -57 for Export and Estimate jobs.<br>-58 for Import, Network and SQL_File jobs. |
| 504 | DUPLICATE | NUMBER | Internal Id for distinguishing Metadata transforms |
| 1717 | NAME | VARCHAR2(30) | Name of Remap or Transform. Legal name is: SEGMENT_ATTRIBUTES. |
| 1717 / 1719 | OLD_VALUE | VARCHAR2(4000) | Specifies value to be remapped for remaps. Null otherwise. |
| 1717 / 1721 | VALUE_T | VARCHAR2(4000) | Specifies new value for remaps. For transforms, specifies the value. |
| 1717 / 1723 | VALUE_N | NUMBER | Definition of a numerical filter. |
| 1717 | OBJECT_TYPE | VARCHAR2(30) | Object class affected by the remap or transform. If NULL, the remap or transform affects all applicable object classes. |

METADATA_TRANSFORM row 1715 (525)

Fig. 17

| | Column Name | Datatype | Meaning |
|---|---|---|---|
| 503 | PROCESS_ORDER | NUMBER | -59 for Export jobs.<br>-60 for Import and SQL_File jobs. |
| 504 | DUPLICATE | NUMBER | Internal Id for distinguishing Parameters |
| 1803 | NAME | VARCHAR2(30) | Name of PARAMETER. |
| | IS_DEFAULT | NUMBER | If non-zero, parameter setting was not supplied by the client. |
| | VALUE_T | VARCHAR2(4000) | Specifies the value set for a text parameter. |
| | VALUE_N | NUMBER | Definition of a numerical parameter. |

PARAMETER row 1801 (527)

| | Column Name | Datatype | Meaning |
|---|---|---|---|
| 503 | PROCESS_ORDER | NUMBER | -73 for Export jobs.<br>-74 for Import and SQL_File jobs. |
| 504 | DUPLICATE | NUMBER | 0 |
| 1807 | VALUE_T | VARCHAR2(4000) | A DDL command to reestablish the NLS settings for the job. |

NLS_PARAMS row 1805 (527)

Fig. 18

```
     DECLARE
          handle        NUMBER;

     BEGIN
1903      handle := DBMS_DATAPUMP.OPEN( 'EXPORT', 'FULL', NULL,
                                        'MYDBMOVE_EXPORT');
1905      DBMS_DATAPUMP.ADD_FILE(handle, 'file1.dmp',
                                  'MY_DIR1', '600M');
          DBMS_DATAPUMP.ADD_FILE(handle, 'file2.dmp',
                                  'MY_DIR2', '600M');
          DBMS_DATAPUMP.ADD_FILE(handle, 'file3.dmp',
                                  'MY_DIR3', '600M');
1907      DBMS_DATAPUMP.METADATA_FILTER(handle, 'SCHEMA_EXPR',
                                         '!= ''BLAKE''');
1909      DBMS_DATAPUMP.SET_PARALLEL(handle, 3);
1911      DBMS_DATAPUMP.START_JOB(handle);
1913      DBMS_DATAPUMP.DETACH(handle);
     END;
```

1901

```
     DECLARE
        handle        NUMBER;

     BEGIN
1917    handle := DBMS_DATAPUMP.ATTACH ('MYDBMOVE_EXPORT');
1919    DBMS_DATAPUMP.STOP_JOB(handle, 1, 1, 0);
     END;
```

1915

```
     DECLARE
        handle        NUMBER;

     BEGIN
1923    handle := DBMS_DATAPUMP.ATTACH ('MYDBMOVE_EXPORT');
1925    DBMS_DATAPUMP.ADD_FILE(handle, 'file4.dmp',
                               'MY_DIR4', '600M');
        DBMS_DATAPUMP.ADD_FILE(handle, 'file5.dmp',
                               'MY_DIR5', '600M');

1927    DBMS_DATAPUMP.SET_PARALLEL(handle, 5);
1929    DBMS_DATAPUMP.START_JOB(handle);
1931    DBMS_DATAPUMP.DETACH(handle);
     END;
```

```
BEGIN
  2003 handle := DBMS_DATAPUMP.OPEN( 'IMPORT','FULL', NULL,
                                     'MYDBMOVE_IMP');

  2005 DBMS_DATAPUMP.SET_PARAMETER(handle, 'KEEP_MASTER', 0);
       DBMS_DATAPUMP.ADD_FILE(handle, 'file1.dmp',
                              'MY_NEWDIR1', '600M');
       DBMS_DATAPUMP.ADD_FILE(handle, 'file2.dmp',
                              'MY_NEWDIR2', '600M');
  2007 DBMS_DATAPUMP.ADD_FILE(handle, 'file3.dmp',
                              'MY_NEWDIR3', '600M');
       DBMS_DATAPUMP.ADD_FILE(handle, 'file4.dmp',
                              'MY_NEWDIR4', '600M');
       DBMS_DATAPUMP.ADD_FILE(handle, 'file5.dmp',
                              'MY_NEWDIR5', '600M');

  2009 DBMS_DATAPUMP.METADATA_REMAP(handle, 'MAP_TABLESPACE',
                                    'USER1', 'NEWUSER1');
  2011 DBMS_DATAPUMP.SET_PARALLEL(handle, 4);
  2013 DBMS_DATAPUMP.START_JOB(handle);
  2015 DBMS_DATAPUMP.DETACH(handle);
END;
```

Table 1: APIs and Job states

| API | Valid Job states for API | Description |
|---|---|---|
| ADD_FILE 2103 | Defining<br>Executing[a]<br>Idling[a]<br>Stop pending | Specifies a file for the dump file set, or the location of the log file or the location of the file to receive the SQL_FILE output. |
| ATTACH 2105 | Defining<br>Executing<br>Idling<br>Stop pending<br>Stopped<br>Completing<br>Completed | Allows a user session to monitor a job |
| DATA_FILTER 2107 | Defining | Restricts data processed by a job |
| DETACH 2109 | Defining<br>Executing<br>Idling<br>Stop pending<br>Completing | Disconnects a user session from a job |
| GET_STATUS 2111 | | Obtains the status of a job |
| LOG_ENTRY 2113 | | Adds an entry to the log file |
| METADATA_FILTER 2115 | Defining | Restricts metadata processed by a job |
| METADATA_REMAP 2117 | Defining | Remaps metadata processed by a job |
| 2119 METADATA_TRANSFORM | Defining | Alters metadata processed by a job |
| OPEN 2121 | Undefined | Creates a new job |
| SET_PARALLEL 2123 | Defining<br>Executing<br>Idling<br>Stop pending | Specifies parallelism for a job |
| SET_PARAMETER 2125 | Defining | Alters default processing by a job |
| START_JOB 2127 | Defining<br>Idling | Begins/resumes executing a job |
| STOP_JOB 2129 | Defining<br>Executing<br>Idling<br>Stop pending | Initiates orderly shutdown of a job |

a. Export jobs only

Fig. 21

APPARATUS AND METHODS FOR TRANSFERRING DATABASE OBJECTS INTO AND OUT OF DATABASE SYSTEMS

CROSS REFERENCES TO RELATED APPLICATIONS

This application incorporates U.S. Ser. No. 09/672,914, George Claborn, et al., Aggregating and manipulating dictionary metadata in a database system, filed Sep. 28, 2000, and U.S. Ser. No. 10/014,038, Lee B. Barton, System having heterogenous object types, filed Oct. 10, 2001, by reference for all purposes. Also incorporated by reference is Oracle 9i Database Utilities, Release 2, Mar. 2002, Part No. A96652-01, available from Oracle Corporation, Redwood Shores, Calif.

BACKGROUND OF THE INVENTION

1. Field of the Invention

The invention relates to database systems generally and more particularly to transferring database objects between database systems.

2. Description of Related Art

A database system provides persistent storage for items of data, organizes the items of data into objects, and manipulates the items of data by means of queries which describe a set of objects. A common kind of database system is a relational database system. Among the objects in a relational database system are tables. Each table has one or more columns and zero or more rows. For example, a two-column table called employees may look like this:

| Name | Pay |
|---|---|
| Bob | 50,000.00 |
| Tom | 60,000.00 |
| Jack | 110,000.00 |

The objects in the Name column are the names of employees; the objects in the Pay column are values specifying the employee's annual salary. A query on the table employees might look like this:

select Name from employees where Pay>100,000;

This query will return the set of values from the Name column that belong to rows which satisfy the condition that the value of Pay in the row be greater than 100,000. Here, the set of values consists of the name from the third row, namely "Jack". The query is written in the SQL (Structured Query Language) language. SQL is used to manipulate objects in relational database systems. SQL has two sublanguages: DML (Data Manipulation Language) which is used to manipulate non-metadata objects, and DDL (Data Definition Language), which is used to manipulate metadata objects. For example, the above query is written in the DML sublanguage; DDL was used to define the table employees.

Each object in the database system has an object type that describes how the object is defined and what can be done with it. For example, all table objects in the database system are objects of type table. In terms of how the objects are used in a relational database system, there are two kinds of objects: user objects like the one above that contain information belonging to users of the database system and system objects that contain information belonging to the database system itself. The database system uses the information in the system objects to manage the database system. Among the system objects are tables that contain information which describes all of the other objects in the database system. The information that describes an object is termed the object's metadata and an object that contains metadata for an object is termed herein a metadataobject. An object that does not contain metadata is termed herein an ordinaryobject For example, one of the metadata objects is a table that has an entry for each of the tables, both ordinary and metadata, in the relational database system. Metadata in this table and in other metadata objects associated with it specify the name of the table employees, the names of its columns, the type of data that may be contained in each column, the number of rows currently in the table, and the location in the database system of the actual data for the table employees.

Transferring database objects between database systems is made difficult by the fact that the objects may be very large and by the fact that any such transfer must maintain the objects' organization, including how the objects are ordered and the relationships between them. For example, even a simple table like employees must be transferred in a way which maintains the relationships between employee names and pay. Most database systems have export and import utilities for performing such transfers. The export utility puts the objects into a form which permits another database system to reconstruct the objects and the import utility reconstructs the objects from the exported form. Utilities also exist for importing data into a database from a non-database source.

Import and Export Between Databases

FIG. 1 provides an overview of the export and import utilities that were used previously to the present invention in the relational database systems manufactured by Oracle Corporation, Redwood Shores, Calif. 94065. Complete descriptions of these utilities for the Oracle® 9i database system may be found in *Oracle 9i Database Utilities*, Release 2, Part Number A96652-01, obtainable from Oracle Corporation. What the export utility does is shown at 101. The utility makes a database 103 containing a number of objects into a serial export file 105. The utility orders the objects in export file 105 such that objects that contain information required to build other objects precede those objects. For example, a table object in a relational database management system may have an index object associated with it. The index object permits quick location of the objects in the table indexed by the index object. In the following, an object which requires information from another object to be built is said to be dependent on the other object. Included in export file 105 but not shown is a copy of the metadata for database 103; it has been converted into SQL Data Definition Language (DDL) statements that can be used in a destination database system with the objects in file 105 to create a copy of database 103 in the destination system.

Once the export file has been made, it is transferred to the destination database management system which is to import the database on the file. Transfer may be by sending the export file across a network or by making a copy of the export file on a portable medium and transferring the portable medium to the database management system which is to import the database on the file. Once the export file is available to the importing database management system, that system's import utility 107 serially reads the export file and uses the DDL to create the objects in file 106 in the destination database management system. Because the export file is ordered such that objects that have dependent objects precede the dependent objects in the export file, the information that export needs to create an object in database 103 is always available at the time the object is being created.

Import from Non-Database Sources

When data is imported into a database system from a non-database source such as a data file, the import operation must describe how the data in the source relates to the objects in the database. For example, if a data file to be loaded into the table employees has the data in the form Bob; 50,000; Tom; 60,000.00; Jack; 110,000; the import operation must specify that the first item in the file corresponds to the first field in a row of employees and the second to the second field in a row.

In the Oracle 9i database system, the utility for importing data into the database system from a non-database source is the SQL*Loader, which is described in the *Oracle9i Database Utilities* reference cited above. FIG. 2 is an overview of the operation of the SQL*Loader. SQL*Loader 201 takes one or more input data files 203, extracts data items from the files, and writes them into tables in database 103. A log file 207 records the course of the load operation, bad files 209 contain data items that should have been written to database 103 but could not be, and discard files 211 contain data items that were filtered from the items to be written to database 103. Loader control file 205 specifies how the desired data items are to be located in the input data files, what fields in the database tables the data items are to be written to, and how the data items are to be filtered. One way in which loader control file 205 specifies how the desired data items are to be located in the data file is by creating an external table definition in the database system. The data for the external table specified in the external table definition does not exist in the database system. Instead, the definition describes how fields in the external table relate to data items in the external source. The load operation is then specified by means of an update operation which updates fields in the database system's tables from fields in the external table. An important advantage of the external table definition is that it permits the use of facilities in the database system for operating on database objects in parallel in importing data from the external source. If the external table definition defines a table which, if it were a table in the database system, could be operated on in parallel, the load can be done in parallel.

Problems with Existing Export and Import Utilities

Most commercial database systems include utilities like the export, import, and SQL*Loader utilities employed in the Oracle9i database system. While these utilities do perform their intended functions, they have a number of drawbacks which make them inefficient and hard to use:

- The utilities for exporting objects to and importing objects from other database systems write and read export files 105 serially; consequently, these utilities cannot take advantage of the database system's ability to perform operations in parallel to speed the export and import operations.
- None of the export or import utilities is restartable; if an export or import job is interrupted at any point for any reason, it must be started over again from the beginning.
- The only status information provided for an ongoing export or import operation is the log file produced by the utility and many events in the operation do not result in an entry in the log file.
- Once an export or import job is started, the operator has no further control over it.
- While the utilities may be used to do fileless transfers, none of them has been specifically designed for that purpose.
- Current export and import utilities have limited capabilities for transforming metadata during an import operation or filtering and selecting objects during either import or export.

It is an object of the present invention to provide export and import utilities that overcome these and other drawbacks of existing export and import utilities.

SUMMARY OF THE INVENTION

The above object of the invention is attained by using a control object in the database management system to control performance of a job which transfers a set of objects into or out of the data base management system by a mechanism that transfers database objects. In a preferred embodiment, the control object is a table, the master table, in the database system that is performing the transfer. The control object may specify a set of the objects to be transferred, an order in which the transfer mechanism transfers objects and which may be an order based on the size of the object, or a filter that further specifies the set of objects. The control object may further specify an operation on one or more objects being transferred, including a transformation of the object or a remapping of a name in the object. The control object may further specify one or more parameters for the job.

The control object further includes a specification of a status of the job which is updated by the transfer mechanism during the transfer. The control object is queryable to obtain a current status of the job from the specification of the status and the data transfer mechanism uses the specification of the status of the job to restart the job after the job has been stopped.

The kinds of transfer operations which the transfer mechanism performs under control of the control object include an export operation which transfers objects from either the DBMS in which the transfer mechanism is executing or a remote DBMS to a dump file set accessible to the DBMS and an import operation which transfers objects to the DBMS in which the transfer system is executing from either a dump file set or a remote DBMS.

In another aspect, the invention is a set of files for transferring a set of database objects into a database management system. The set of files includes at least one file containing the objects belonging to the set and a control object in the set of objects that specifies for each object the location of the object in the set of files and an order in which the database management system transfers objects during the transfer.

In a further aspect, the invention is a method of performing a job that transfers a set of database objects using a transfer mechanism that operates under control of the control database object. The method includes the steps of defining the job's control database object and executing the job by causing the transfer mechanism to transfer the set of database objects under control of the job's control object. In either the step of defining the job or executing it, the steps of attaching to the job in order to read and/or modify the control object or of getting the job's current status may be performed. Once the step of attaching to the job has been performed, the steps of stopping the job, starting a stopped job, or specifying a degree of parallelism for the job may be performed. In the step of defining the job, the steps of specifying a source and/or destination for the job, specifying the set of database objects, the step of defining a filter or the step of defining an operation on objects of the set may be performed.

In a still further aspect of the invention, the transfer mechanism performs the method of obtaining metadata for an object type, using the metadata to make a determination of the composition of the objects of the type, and selecting a transfer technique for objects belonging to the type from a plurality thereof according to the determination, and transferring the objects belonging to the type according to the selected transfer technique. In the selected technique, the objects may be transferred in parallel.

Other objects and advantages will be apparent to those skilled in the arts to which the invention pertains upon perusal of the following Detailed Description and drawing, wherein:

BRIEF DESCRIPTION OF THE DRAWING

FIG. 1 is an overview of prior-art utilities for exporting objects from and importing them into database systems;

FIGS. 10-18 together describe the types of rows and the non-null fields in each row type in a preferred embodiment of master table 321;

FIG. 19 is an example of code that uses the Data Pump API to perform an export operation;

FIG. 20 is an example of code that uses the Data Pump API to perform an import operation;

FIG. 21 is a table showing all of the calls in the Data Pump API, the states of a job in which the call may be performed, and the function performed by the call;

Figure 2:
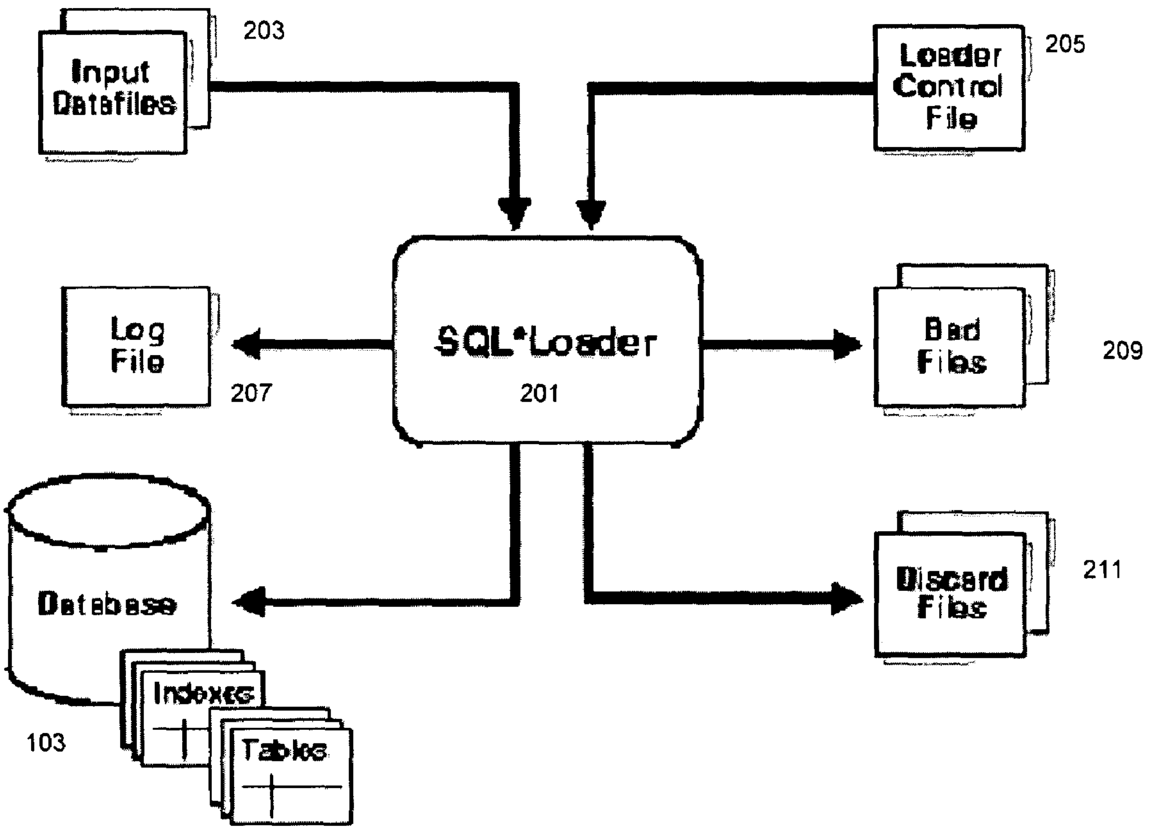
FIG. 2 is an overview of a prior-art utility for importing objects into a DBMS from a non-database system source.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first present an overview of the invention and its use and will then present details of a presently-preferred embodiment.

Overview of the Invention

Figure 3:
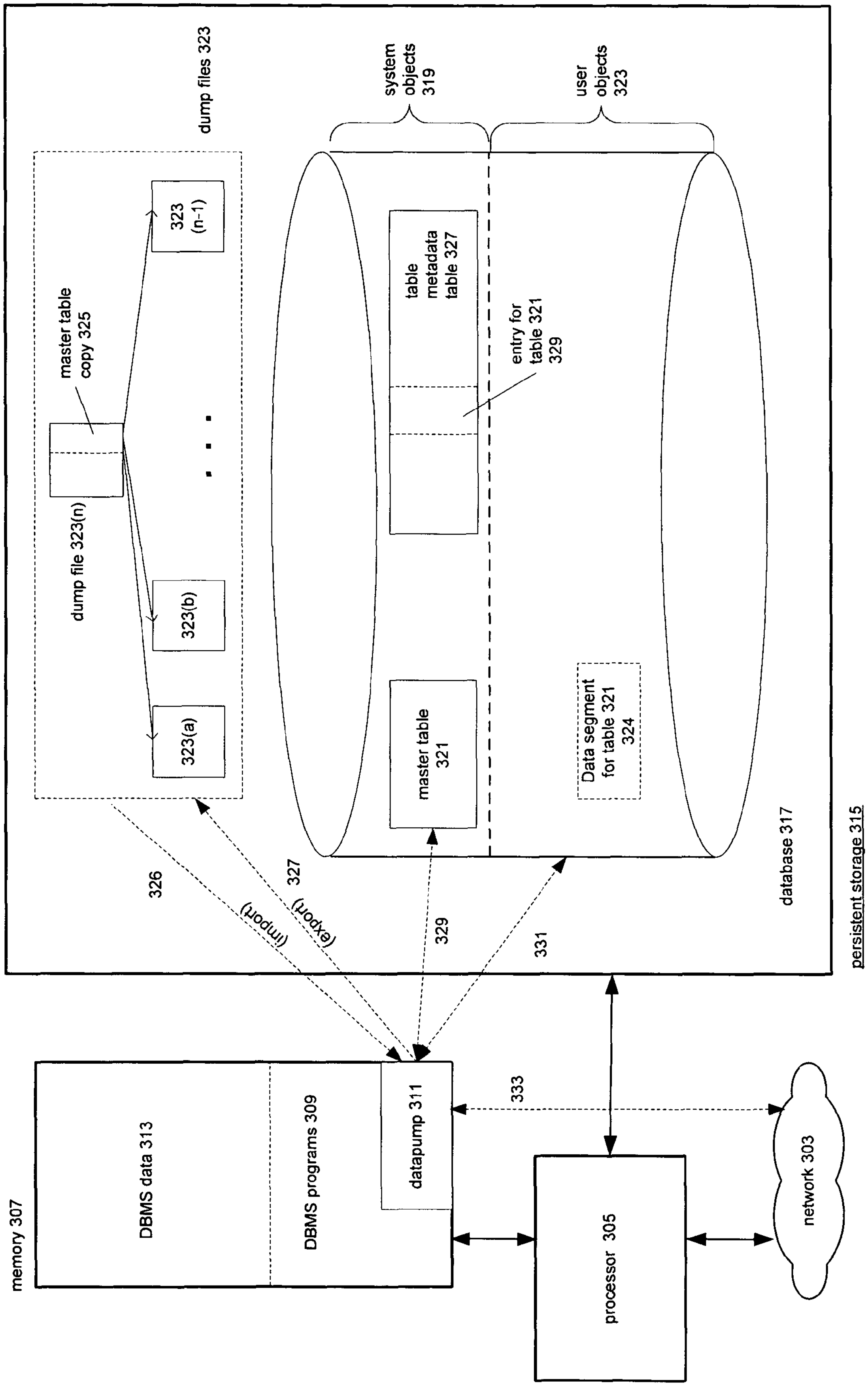
FIG. 3 is a high-level block diagram of apparatus for transferring objects into or out of database systems according to the invention.

Overview of a Database System Including the Invention: FIG. 3

FIG. 3 is a high-level block diagram of a database management system 301 that includes the invention. The major components of database management system 301 are those normally found in such systems: a processor 305, memory 307, and persistent storage 315. Processor 305 is further connected to other systems including other database management systems by network 303. Memory 307 serves as temporary storage for programs 309 being executed and data 313 being manipulated by processor 305; persistent storage for programs and data is provided by persistent storage 315. As shown by the solid-line arrows, processor 305 can read and write memory 307 and can perform I/O operations on persistent storage 315 and network 303.

DBMS programs 309 executed by processor 305 organize part of persistent storage 315 into a database 317, i.e., the persistent storage is organized into database objects that can be manipulated by DBMS programs 309. In FIG. 3, DBMS 301 is presumed to be a relational database management system, so the objects are predominantly tables, but the techniques described herein can be applied to any other kind of database management system and to other kinds of objects as well. As indicated above, there are two kinds of objects in DBMS 301: user objects, which are defined by users of DBMS 301, and system objects, which are defined by DBMS 301 itself and which in part contain the metadata that describes both the user objects and the system objects. One such metadata object is shown: table metadata table 327, which has an entry 329 in it for every table in database 317. The entry shown is for master table 321, a system object in database 319. The function of this table will be described later. Entry 329, like that for any of the tables in database 317, contains the definition of table 321 itself, the definitions of all of the columns in the table, a specification of the number of rows currently in the table, and a specification of one or more data segments 324 in persistent storage 315 that actually contain table 321's data items. Each object in database system 317 has at least one segment 324 corresponding to it. In the following, a segment 324 that contains data items from a metadata object is termed a metadata segment and one that contains data items from an ordinary object is termed a data segment. The set of segments that contains an object's data items may be further divided into partitions. Segments of a particular object that belong to different partitions may be read and/or written in parallel by processor 305.

Export of objects from DBMS 301 and import of objects into system 301 is done by a program 311 in DBMS programs 309 which will be termed herein the Data Pump program. As may be seen by dashed arrow 331, Data Pump program 311 operates on database 317. Import may be by way of a network, as shown by arrow 333; as shown by arrows 326 and 327, either import or export may be by way of one or more dump files 323, which are stored in persistent storage 315.

As shown by arrow 329, what objects Data Pump 311 exports or imports, how Data Pump 311 exports or imports the objects, and what operations it performs on the objects are determined by master table 321, a table that exists in database 317 at least for the duration of the export or import job. Master table 321 contains information about the current status of an export or import job and restart information. Data Pump 311 makes the current status information available to a user of system 301 who is monitoring the export or import job. Data pump 311 uses the restart information to restart the operation after a user of system 301 has stopped it or after a shutdown due to an error. Because master table 321 is an object in the database system, all of the operations offered by the database system are available to manipulate master table 321. For example, the current status may be read from the table by means of a query. Another advantage of master table 321 is that it is a persistent object: it represents the import or export operation and makes the operation's status available for the entire life of the operation, from the definition of the operation through its execution to its completion and even thereafter, and this in turn makes it possible for a user to attach to and detach from the import or export operation, obtain status information about the operation, and also for a user to stop or restart the operation.

In a preferred embodiment of DBMS 301, Data Pump 311 can perform the following operations:

export objects from DBMS 301 in which Data Pump 311 is executing to a set of dump files 323 accessible to DBMS 301;

export objects from a remote DBMS to which DBMS 301 in which Data Pump 311 is executing has a link to a set of dump files 323 accessible to DBMS 301;

import objects from a set of dump files accessible to DBMS 301 into DBMS 301;

import objects from a remote DBMS to which DBMS 301 in which Data Pump 311 is executing has a link into DBMS 301 (termed in the following fileless import); and make the metadata for a set of database objects in a dump file or a remote DBMS into an SQL script in a file accessible to DBMS 301.

In FIG. 3, the import and export operations involving dump file set 323 are shown by arrows 326 and 327; arrow 331 indicates that the objects in the import and export operations may be obtained from or written to database 317; arrow 333, finally, indicates that Data Pump 311 may obtain objects from a remote DBMS via network 303 for either an export operation to a set of dump files 323 or a fileless import operation to database 317. If there are n dump files in set 323, dump file 323(*n*) includes a copy 325 of master table 321 which controlled Data Pump 311 while Data Pump 311 was making dump file set 323. Master table copy 325 contains a list of dump files 323(*a* . . . n) and thus serves as a directory for the dump files. As will be explained in more detail later, copy 325 is used to make the master table 321 used for an import operation that uses dump files 323. The dump files may be moved from the exporting system 301 to the importing system 301 by any available method.

Figure 5:
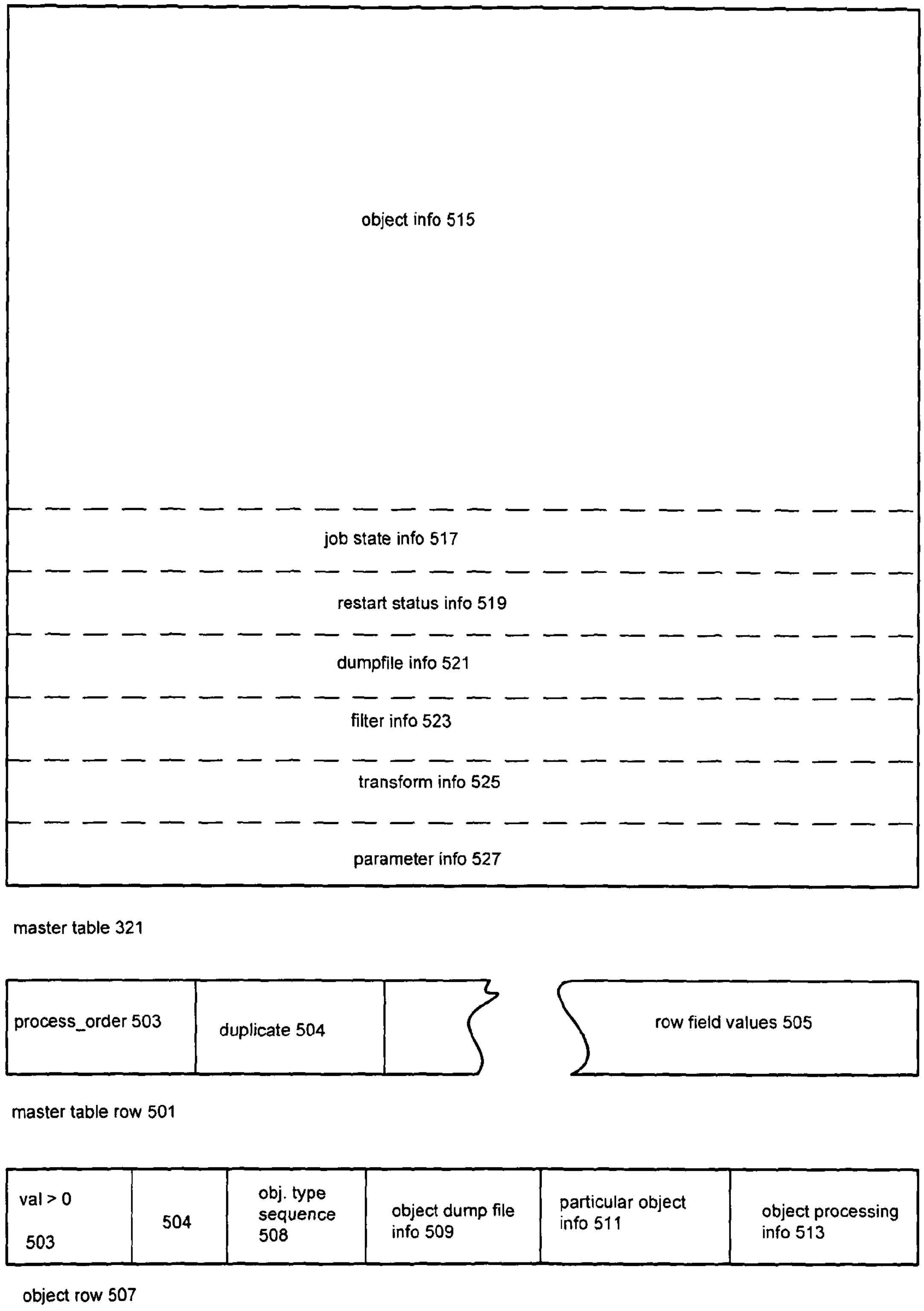
FIG. 5 is an overview of master table 321.

Overview of Master Table 321: FIG. 5

FIG. 5 is a logical overview of master table 321. Master table 321 contains the following kinds of information about an import or export job:

object information 515, which describes the database objects being imported or exported;

job state information 517, which describes how far the export or import job has progressed and what its current state is;

restart status information 519, which describes the results of restarting the import or export job after it has been stopped either intentionally or as a result of an error;

dump file information 521, which specifies the dump files 323 being written by the export job or read by the import job;

filter information 523, which describes filters that may be applied to the objects being imported or exported;

transform information 525, which describes transformations and remappings that may be applied to the metadata being imported or exported; and parameter information 527, which describes parameters used to define the import or export operation.

The information other than object information 515 specifies attributes of the export or import job and will be termed generally attribute information herein.

The information in master table 321 is contained in rows 501. Although FIG. 5 shows the kinds of information as being located in discrete portions of master table 321, rows containing different kinds of information may occur anywhere in the table. All of the rows have the same fields 505, but the kind of information contained in a particular row determines which fields are used in that row. Unused fields are set to NULL. The kind of information contained in a given row is specified by process_order field 503. Duplicate 504 is used to distinguish different rows with the same process_order value 503 from each other. A record's <process_order, duplicate> pair uniquely identifies the record in master table 321. In the case of rows containing object information 515, process order field 503 has a positive integer value; each row that contains object info has a different positive integer value in field 503 and the order of the values determines the order in which the rows are processed in an export or import operation. With rows containing other kinds of information, the type of the row is indicated by a negative value; for most of the other kinds of information, there are two such negative values; one indicates that the row's information is to be used in an export operation and the other indicates that the row's information is to be used in an import operation.

Further details of a row of object information may be seen at 507. As previously mentioned, process_order field 503 has an integer value greater than 0. Duplicate field 504 is used when the information for the object may be subdivided in a fashion which permits parallel copying of the object. In this case, there is a separate object row 504 for each such subdivision of the object. Object type sequence field 508 is used together with process_order field 503 to order processing of the objects represented by the object rows. Each object has a type and all objects belonging to a particular type are processed together, with the object's process_order field indicating the order in which the object is processed relative to other objects of its type. Field 508 indicates the order in which the types of objects are processed. The remaining fields in a row 507 contain object dump file information 509, which specifies where the data for the object represented by the row is located in dump files 323, particular object information 511, which describes the particular object represented by row 507, and object processing information 513, which describes how the object represented by row 507 is to be or has been processed in the export or import operation.

An important advantage of master table 321 is that it is a database table. As such, information may be written to and read from master table 321 using any of the operations available in database management system 301. To cite two examples: filters that filter objects can be applied directly to master table copy 325 instead of to dump files 323 and status information can be retrieved simply by querying master table 321. Further, as with any database table in system 301, operations may be performed on different rows of the table in parallel. Another advantage is that compatibility between Data Pump implementations that use different versions of master table 321 can be maintained simply by providing transforms that transform a master table 321 for one Data Pump implementation into a master table 321 for a different implementation.

Figure 9:
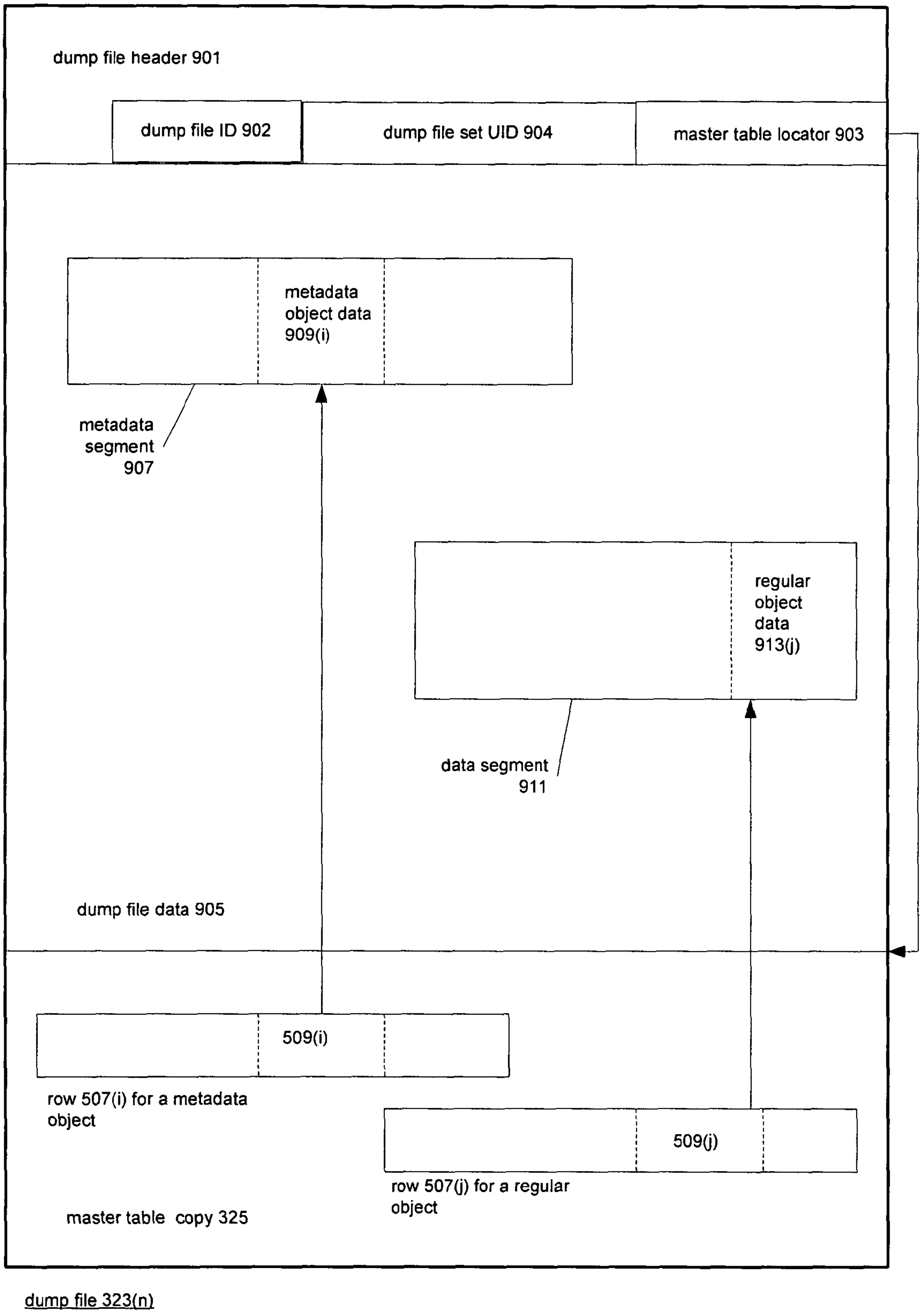
FIG. 9 is an overview of dump file 323(*n*)

Overview of Dump File 323(*n*): FIG. 9

FIG. 9 is an overview of dump file 323(*n*), which is the dump file that contains master table copy 325. The other dump files differ from dump file 323(*n*) only in that they do not contain master table copy 325. Dump file header 901 contains information about dump file 323(*n*); for the present discussion, the information of interest is master table locator 903, which specifies the beginning and extent of master table copy 325 in dump file 323(*n*), dump file set ID 904, which is a sunique identifier for the dump file set the dump file belongs to, and and dump file ID 902, which is an identifier for the dump file within dump file set 323. In dump files other than dump file 323(*n*), the values in master table locator 903 are set to 0, to indicate that no master table copy is present.

Dump file data 905 is located between header 901 and master table copy 325. The data is stored in segments. Different segment types are used for metadata and non-metadata. Metadata is contained in metadata segments 907. The metadata in the metadata segments is represented using the well-know extended markup language (XML) standard. The XML for the metadata for one object is shown at 909(*i*) in segment 907. A metadata segment may contain the XML for the meta-data for a number of objects. Data segment 911 contains the data for a non-metadata object. Such objects are termed in the following regular objects. A segment may contain data from only one regular object, but data from a single large regular object may be contained in many segments. Dump file information 509 in an object row 507 identifies the location of an object's data in a metadata segment 907 or a data segment 911 of a dump file 323(*i*), as shown with regard to rows 507(*i*) and (*j*) in FIG. 9.

Figure 6:
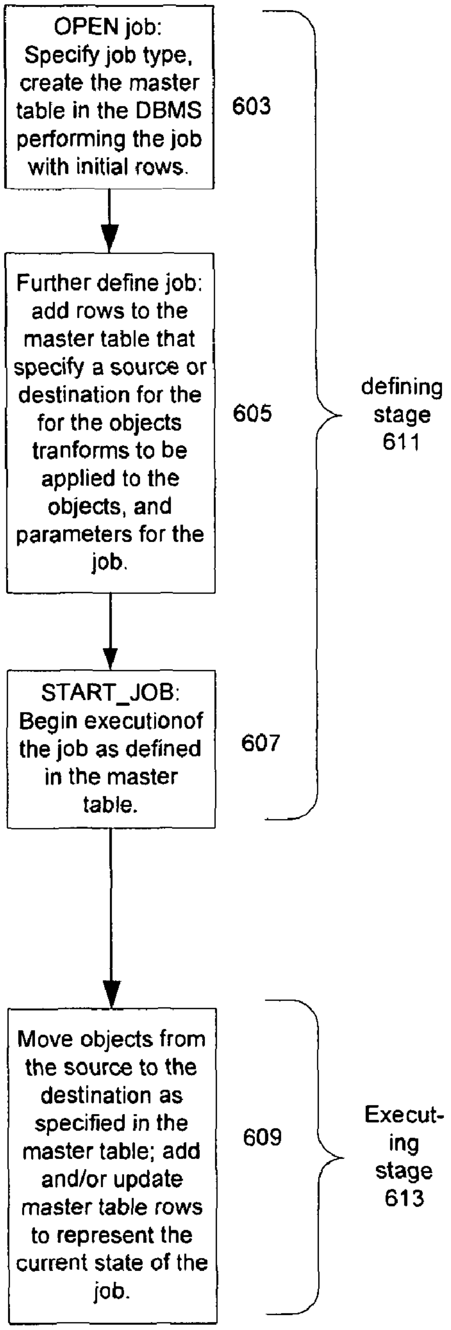
FIG. 6 is a flow chart which presents a general overview of the operation of the Data Pump.

Overview of Operation of the Invention: FIG. 6

FIG. 6 is a flowchart 601 showing how a job done by Data Pump 311 looks to the database administrator (DBA) who is using Data Pump 311. From the point of view of the DBA, a job has two stages:

- a defining stage 611 in the job is defined. In this stage, the job type is specified, the master table 321 for the job is created in the DBMS doing the job and initialized, and rows are added as required to define object sources or destinations, transforms to be applied to the objects, and parameters for the job.
- an executing stage 613 in which the job specified in master table 321 is performed; objects are moved from a source to a destination as specified for the job and the master table is updated to reflect the current state of the job. When the job is finished, there is a row in the master table for each object that was moved.

Defining stage 611 is initiated by an OPEN call to Data Pump 311 and ended by a START_JOB call to the Data Pump. At any point in defining stage 611 or executing stage 613, a DBA or other user with the proper access privileges may make an ATTACH call to the Data Pump which gives the DBA access to the job and permits the DBA to examine the current state of the job. An ATTACH is a side effect of the OPEN call. An ATTACHed DBA is thus one who has OPENed a job or made an ATTACH call and has not yet made a DETACH call. In defining stage 611, the ATTACHed DBA may add rows to master table 322 which define filters, transforms, and parameters. The ATTACHed DBA may also terminate the job with a STOP_JOB call to Data Pump 311; at this point, STOP_JOB destroys master table 321 and the job ceases to exist.

In executing stage 613, an ATTACHed DBA may make the START_JOB call, may further define the job by adding files to dump file set 323 or changing the degree of parallelism with which objects are transferred, may examine the current state of the job, and may stop the job with the STOP_JOB call. As long as STOP_JOB is executed after a START_JOB call and does not specify that the master table be destroyed, an ATTACHed DBA may make the START_JOB call to restart the job. At any point after performing an OPEN or an ATTACH call, the user may perform a DETACH call. A DETACH does not stop execution of the job. In the preferred embodiment, ATTACH and DETACH may be done via the Internet from a computer which is remote from the system upon which the export or import job is being performed. An ATTACHed user may also perform a GET_STATUS call which runs a query on master table 321 to obtain the job's status at any point in the defining and executing stages.

As set forth in more detail at block 603 of FIG. 6, the OPEN call specifies the topmost object for the job (for example, an entire database), and specifies whether the job is an import or an export job and whether it uses a dump file set. Import jobs that do not use dump file sets are termed herein fileless import jobs. Data Pump 311 uses the information provided in the OPEN call to make initial rows in master table 321. The initial rows indicate whether the job is an export job or an import job and if the job involves a network connection to a database system, they specify the connection.

As shown at 605, following the OPEN call or after an ATTACH call, the DBA may further define the job by means of calls to Data Pump 311 that specify parameters, dump files (if needed), and filters and transforms. The filters and transforms are specified relative to the source of the objects being transferred; thus in an export operation, they are specified relative to the objects as they exist in the database system which is their source; in an import operation from dump files, the filters and transforms are specified relative to the objects as they exist in the dump files; in an import operation from a data base system, they are specified relative to the objects as they exist in the database system. Specifications of filters, transforms, parameters, and dump files result in rows being added to master table 321 for each filter, transform, parameter, and dump file. Particular rows for these entities are identified by their <process_order, duplicate> pairs. The job's defining stage 611 is terminated by the first START_JOB call to Data Pump 311 for the job, as shown at 607. START_JOB may follow an OPEN call if there has been no DETACH call made since the OPEN call; otherwise, it must follow an ATTACH call.

The first START_JOB call begins executing the job as it has been defined in the master table 321 that resulted from defining stage 611 and thus commences executing stage 613. As shown in detail at 609, in the execution stage, Data Pump 311 copies the objects from the source to the destination as specified in the master table and adds and/or updates rows to the master table to represent the current state of the job. Thus, at any point in the job, a GET_STATUS call can obtain the current state of the job from master table 321 and at the end of the job, master table 321 contains a complete record of the job.

Figure 7:
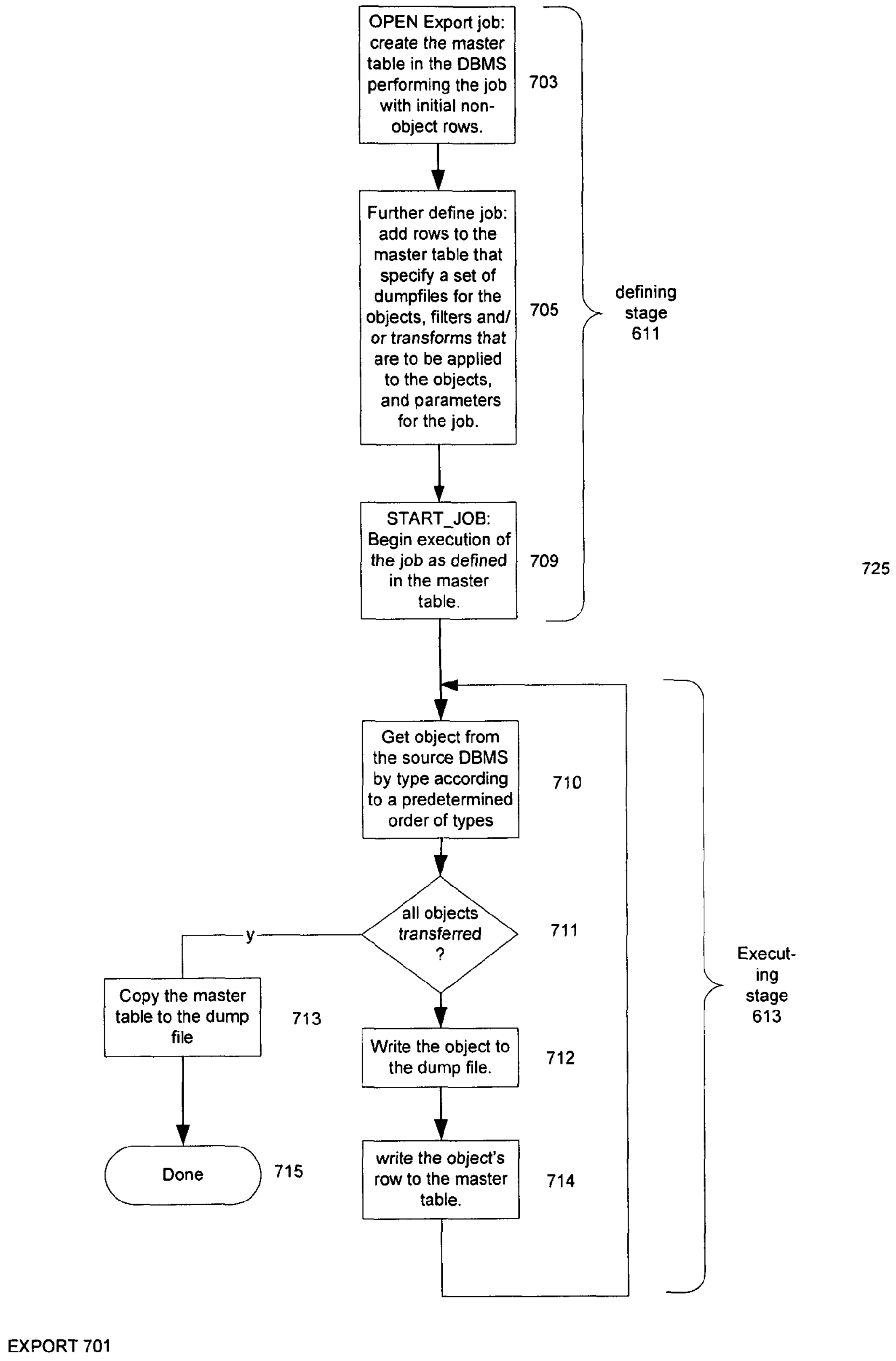
FIG. 7 is a flow chart which presents an overview of an Export operation performed by the Data Pump.

Export: FIG. 7

The Export operation performed by Data Pump 311 always copies the exported objects to a dump file set; the objects being exported may come either from the DBMS which is performing the export operation or from a DBMS to which the DBMS performing the operation is linked by a network connection. Whether an export job gets its objects from the local DBMS or a remote DBMS is specified in the OPEN call for the job and indicated in the job's job status row in master table 321. FIG. 7 is a flowchart 701 for export jobs. Flowchart 701 is similar in general form to flowchart 601. The job begins with an OPEN call, as shown at 703. Then the job is defined further at 705. Included in this further definition is a specification of the dump file set that the objects are to be written to. Rows specifying the files in the dump file set are added to master table 321. Also specified and added as rows to master table 321 are filters that select the objects to be transferred in the job.

In executing stage 613, the export operation copies the objects specified in master table 321 from the source database to dump file set 323. All objects of a particular object type are copied together. The order of the types is predetermined and may be selected to optimize operation of Data Pump 311 as required for a particular operation (710). The current object is copied (712) and then a row representing the object is added to master table 321 (714). When all of the objects have been transferred, master table 321 is copied to the dump file (713), finishing the export operation (715).

If master table 321 specifies filtering for the object, the filtering is done as the object is moved from the source DBMS to dump file set 323. If the object contains metadata, what is fetched from the source DBMS and written to dump file set 323 is an XML representation of the metadata. In each object row 507, the row's object type sequence field 508, process_order field 503, and duplicate field 504 are set to values that ensure that an import operation that uses dump file set 323 will process the objects in the right order. Each object row 507 also specifies the location of the object's data in dump file set 323 in object dump file info 509. The location is specified by dump file ID 902, so that the dump files can be renamed without affecting the operation of Data Pump 311. As will be explained in more detail later, with table objects that do not contain metadata, the table's contents are treated as a separate object having the table data type. Data Pump 311 processes table objects being exported by the size of the table object's table data object, beginning with the largest table data objects. This ensures that during an import operation, the objects will be imported in an order which not only respects object dependencies but also permits the most efficient transfer of the objects to the destination DBMS.

As indicated above, the source of the objects for the export operation may be either the DBMS that is performing the export operation or another DBMS to which the exporting DBMS has a network link. The difference between what is shown in FIG. 7 and what is done when the source DBMS is remote is simply that the object fetching step 710 is performed via the network connection. The technique of fetching objects from a remote DBMS to the DBMS 301 doing the export operation is useful in situations where the remote DBMS cannot execute Data Pump 311. For example, if the database to be exported from the source DBMS is read only in the source DBMS, Data Pump 311 cannot create master table 321 in the database. Data Pump 311 on the exporting DBMS can, however, read the objects in the database from the source and create master table 321 and the dump files on the exporting DBMS. Similarly, if the DBMS doing the export operation has more free storage space or processing power available than the source DBMS, it may be better able to do the export operation than the source DBMS.

Figure 8:
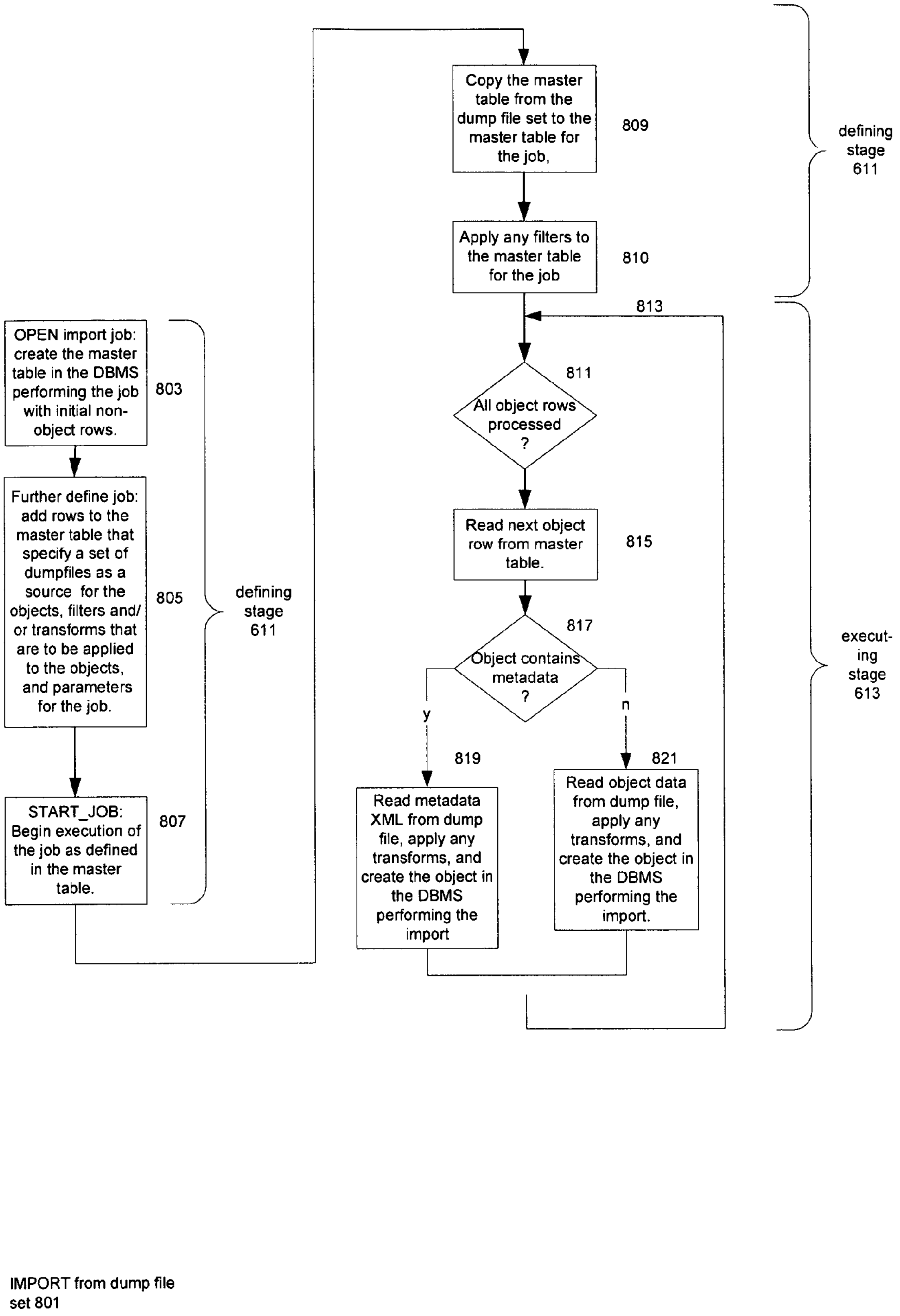
FIG. 8 is a flow chart which presents an overview of an Import operation performed by Data Pump which imports the objects from a dump file set.

Imports from Dump File Sets: FIG. 8

FIG. 8 is a flowchart 801 of an import operation done from a dump file set 323. At the beginning of the operation, dump file set 323 is accessible from the DBMS system doing the import operation. In defining state 611, the OPEN call specifies an import job and creates master table 321 with some initial non-object rows. The further definition of the job at 805 includes rows that specify the location of dump file set 323 in the importing DBMS system, rows for filters and/or transforms that are to be applied to the objects being imported, and rows for parameters for the jobs. As before, a START_JOB call (807) ends defining stage 611. Before actually beginning execution of the job, START_JOB copies master table copy 325 from dump file set 323 for the job to the master table 321 for the job (809). Confusion between non-object rows that apply to export operations and those that apply to import operations is avoided by the use of different negative process_order values for rows that apply to export and rows that apply to import. Then START_JOB applies any filters defined at 805 to master table 321 (810); rows representing objects that have been filtered out are removed from master table 321.

In executing stage 611, Data Pump 311 processes the object rows in master table 321 in the order specified by object type sequence field 508, process order field 503, and duplicate field 504. Thus, all of the objects belonging to a type with the object type sequence number n are processed before objects belonging to a type with the object type sequence number n+1 are processed. As shown by decision block 811, loop 813 runs until all object rows have been processed. For each object row 507, Data Pump 311 reads the row from master table 321. What happens next depends on whether the object is a metadata object (817). If it is, Data Pump 311 reads the XML for the metadata object from the dump file, applies any transforms specified in master table 321, and then uses the metadata as transformed to create the metadata object in the DBMS performing the import (819). If the object is an ordinary object, Data Pump 311 reads the object data from the dump file, applies any transforms, and creates the object in the DBMS performing the import.

Figure 24:
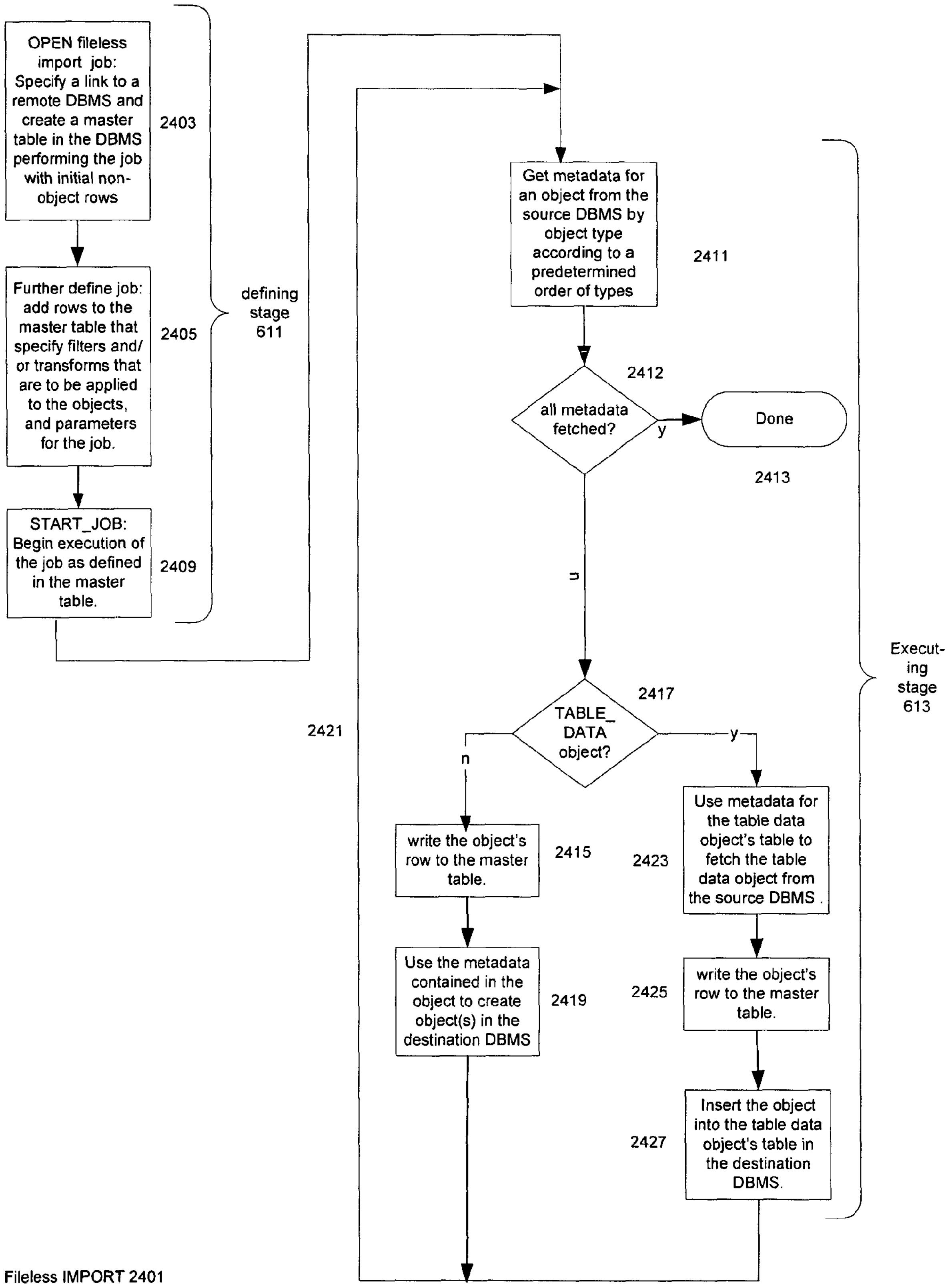
FIG. 24 is a flowchart which presents an overview of a fileless Import operation performed by the Data Pump.

Fileless Import Jobs. FIG. 24

In a fileless import job, there is no dump file set 323 and hence no copy of master table 325. Instead, master table 321 for the fileless import job is built in the same fashion as in an export job: as each object is fetched from the remote source DBMS and written to the importing DBMS, a row for the object is added to the job's master table 321 in the importing DBMS. FIG. 24 presents a flowchart 2401 of a fileless import operation. In defining stage 611, the job is defined and master table 321 is initialized in the same fashion as for an export job (2403). The further definition of the job at 2405 does not specify any dump files and the filters and transforms are to be applied to the objects being imported from the remote source DBMS. As before, defining stage 611 ends with a START_JOB call.

Executing stage 613 also resembles that of an export job. All objects of a particular type are imported together and the types are selected according to a predetermined order that ensures that objects required to create dependent objects are already in the destination DBMS when the dependent object is imported. At 2411, Data Pump 311 fetches the metadata for the next object from the source DBMS; if there is no is metadata left, loop 2421 terminates and the import job is done (2413). What happens next depends on whether the object is a TABLE_DATA object (one that contains data for a table that is an ordinary object) (2417). If the object is not a TABLE_DATA object, what is of interest is the object's metadata. First, a row for the object is created in the master table (2415). Then the metadata is used to create an object or objects in the destination DBMS (2419). If the object is a TABLE_DATA object, the metadata retrieved at 2411 is used to fetch the table data object from the source DBMS (2423). Then the object's row is written to the master table (2425). Finally, the object is inserted into the table data object's table in the destination DBMS (2427). In either case, loop 2421 is then iterated.

Examples of Operation of a Preferred Embodiment. FIGS. 19 and 20

FIGS. 19 and 20 show examples of an export job performed by Data Pump 311 using master table 321 and an import job that uses the dump files made by the export job. The examples are written in PL/SQL using the Application Programmer's Interface to Data Pump 311.

Export Example: FIG. 19

Beginning with code example 1901, this example defines and begins execution of a Data Pump export operation. At 1903, an OPEN call specifies that that a job named MYDB-MOVE_EXPORT is the export of the full database belonging to the user who makes the OPEN call. As a result of the OPEN call, a master table 321 is created with the job's name and a group of initial non-object rows and a handle is returned which is used in succeeding calls to Data Pump 311 to identify the job. Then, at 1905, a succession of ADD_FILE calls creates three dump files and for each dump file a row in dump file info 521. Each ADD_FILE call specifies the handle for the job, the file name for the dump file, the directory for the dump file, and the maximum size of the dump file. At 1907, the METADATA_FILTER call adds a row in filter info 523 which specifies that the entire database except the schema identified by BLAKE is to be exported. This row thus specifies what is to be exported as well as what is not to be exported. The SET_PARALLEL call at 1909 specifies that the job is to be done with a maximum degree of parallelism of three. The START_JOB call at 1911 starts the job and the DETACH call detaches the DBA from the job, which, however, continues executing.

Sometime later, other demands on the exporting DBMS reach a point at which the DBA is required to stop the export job MYDBMOVE_EXPORT. How the DBA does this is shown at 1915. First, the DBA uses an ATTACH call with the job's name to retrieve the handle for the job; then the DBA uses the STOP_JOB call with the handle to stop the job. As a side effect, STOP_JOB also DETACHes the DBA making the STOP_JOB call.

Still later, the demands on the exporting DBMS have lessened to the point that the DBA can not only restart the job, but increase the degree of parallelism. The code at 1921 shows how this is done. First the DBA uses the ATTACH call to reattach to the job (1923); then, at 1926, the DBA adds two more dump files to accommodate the added degrees of parallelism. Addition of the dump files of course results in the creation of rows for the files in dump file info 521. Then the DBA sets the degree of parallelism to 5 (1927), restarts the job (1929), and detaches from it (1931), leaving the job to run to completion with a maximum of five degrees of parallelism.

Import Example: FIG. 20

FIG. 20 shows the code 2001 for specifying an import job that imports from the dump files made by executing the code of FIG. 19. The first call is to OPEN (2003). The call specifies an IMPORT of a full database and the name of the job, MYDBMOVE_IMP. As with import, the result of the call is the creation of a job, of the master table 321 for the import job, and the initial non-object rows in master table 321. Next is a SET_PARAMETER call 2005 which sets a parameter for the job. The parameter that is set by this particular call indicates that master table 321 for the import job is to be retained in the importing DBMS after the import job has been completed. Then comes a series 2007 of ADD_FILE calls, one for each file in the set 323 of dump files produced by the export operation. These calls use the handle returned by OPEN and for each dump file, they specify the name, location in the importing DBMS 301, and size of the dump file. Data Pump 311 creates a row in dump file information 521 of master table 311 for each of the dump files. Given the locations of the dump files, of course, Data Pump 311 can locate the copy 325 of the master table for the export job.

The definition stage is completed by a METADATA_REMAP call and a SET_PARALLEL call. The METADATA_REMAP call describes a transformation to be applied to the metadata in the export job. The transformation replaces all occurrences of the table space name USER1 in the metadata with the new table space name NEWUSER1, which will be the name of the table space in the destination database system 301. At this point, the METADATA_REMAP call results in the creation of a row of transform information 526. The SET_PARALLEL call specifies the maximum degree of parallelism that is to be used in the import operation. Here, the degree "4" is specified. The effect of the SET_PARALLEL call at the definition stage is to set a field that specifies the maximum degree of parallelism in the row in job state info 517.

The executing stage begins with the START_JOB call. With an import job, Data Pump 311 responds to the START_JOB call by copying the entire copy 325 of the master table for the export job into the import master table 311. Then Data Pump 311 executes the job as specified in import master table 311, using the degree of parallelism specified at 2011. As the creation DDL for an object to be created in the destination database system is made from the metadata for the object, the DDL is transformed as specified in the row created by the METADATA_REMAP call. At any time during the executing stage, the DBA may execute a DETACH call as at 2015. This time, there is no need to stop the job, so Data Pump 311 continues to execute the job until it is finished and all of the objects in the dump files have been imported into the destination DBMS system.

Figure 4:
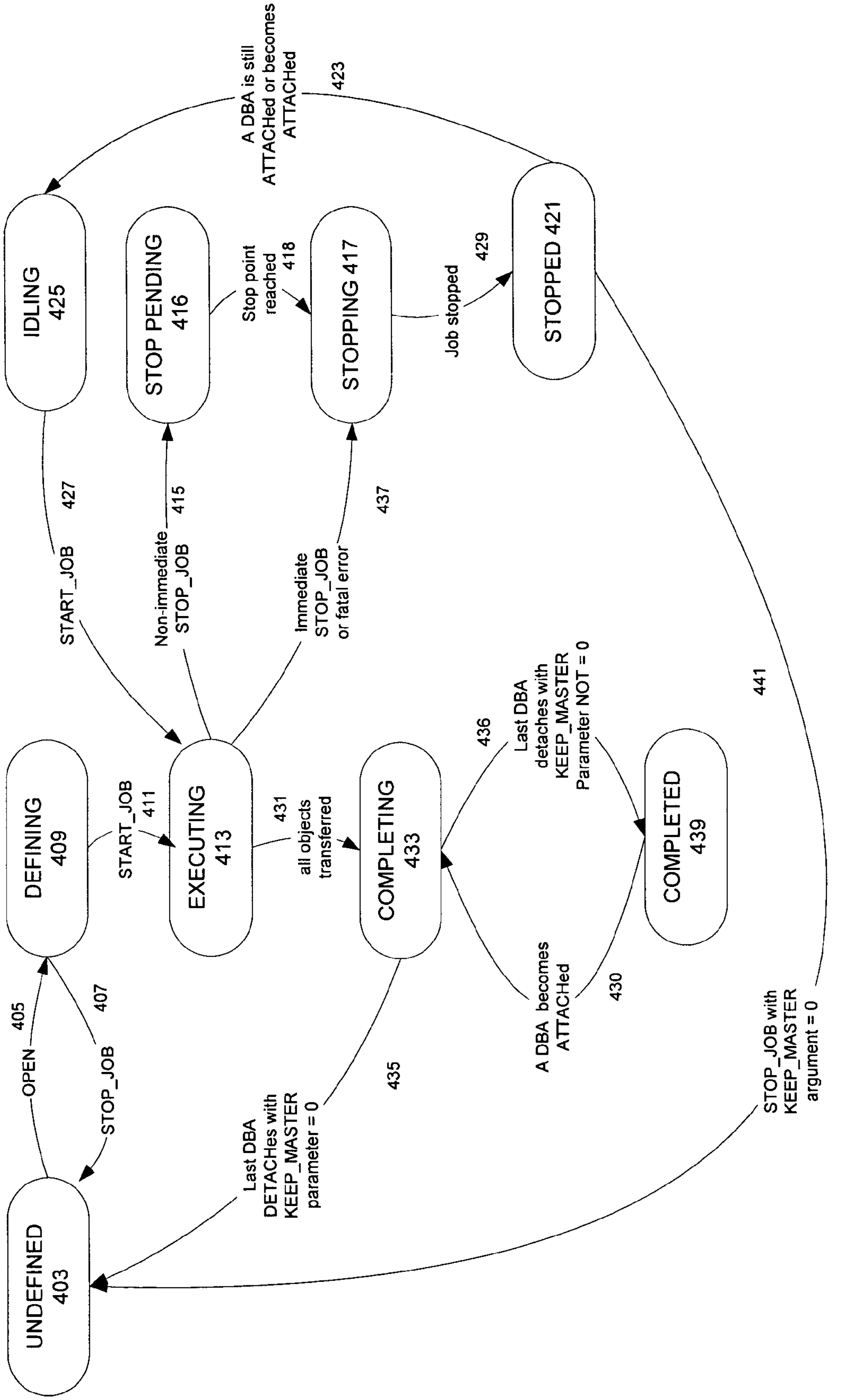
FIG. 4 is a state diagram showing operation of the Data Pump.

Overview of Operation of Data Pump 311: FIG. 4

FIG. 4 is a simplified state diagram of the operation of Data Pump 311. Each of the states is indicated by an oval; transitions between the states and the actions that cause them are indicated by arrows with labels. The states are the following:

- UNDEFINED 403: no master table 301 exists for the job; hence, the only Data Pump operation that is possible in this state is OPEN.
- DEFINING 409: a master table exists, but execution of the job has not yet begun. Operations which define the job prior to execution, ATTACH and DETACH, GET_STATUS, and START_JOB are possible.
- EXECUTING 413: a master table exists and execution of the job has begun. Operations which define the job during execution, ATTACH, DETACH, GET_STATUS, and STOP_JOB are possible.
- STOP PENDING 416: A non-immediate STOP_JOB call has been made but a stopping point for the job has not yet been reached; ATTACH, DETACH, and GET_STATUS are possible.
- STOPPING 415: an orderly stop of the process is being carried out; ATTACH, DETACH, and GET_STATUS are possible.
- STOPPED 421: the process is stopped; ATTACH, DETACH, and GET STATUS are possible.
- IDLING 425: the process is stopped, but a client is still attached; ATTACH, DETACH, GET_STATUS, and START_JOB are possible.
- COMPLETING 433: an orderly finish of the job is being carried out; ATTACH, DETACH, and GET_STATUS are possible.
- COMPLETED 439: the job is finished and the master table still exists; ATTACH is possible.

As for the state transitions, transition 405 from UNDEFINED 403 to DEFINING 409 occurs when Data Pump 311 executes an OPEN call; transition 411 from DEFINING to EXECUTING occurs when Data Pump 311 completes execution of the first START_JOB call received for the job. If the DBA wishes to end the job in the DEFINING state, he or she makes a STOP_JOB call; in response to this call, Data Pump 311 deletes the master table and makes transition 407 to UNDEFINED state 403.

In EXECUTING state 413, Data Pump 311 stops a job in response to a STOP_JOB call or a fatal error. The STOP_JOB call has an argument that specifies an immediate shutdown; in that case or in the case of a fatal error, Data Pump 311 executes transition 437 to STOPPING state 417; otherwise it executes transition 415 to STOP PENDING state 416, in which it continues processing until the job is in a state which permits easy restart and then makes transition 418 to STOPPING 417. When the shutdown performed in STOPPING 417 is finished, Data Pump 311 makes transition 429 to STOPPED state 421. If STOP_JOB includes an argument that specified that Data Pump 311 delete master table 321 for the job, Data Pump 311 makes transition 441 to UNDEFINED 403. Otherwise, if any DBA is still ATTACHed or no DBA is still attached and any DBA makes an ATTACH call, transition 423 from STOPPED 421 to IDLING 425 occurs.

When all objects have been transferred, Data Pump 311 makes transition 431 to COMPLETING 433; if the KEEP_MASTER parameter has been set to indicate that master table 321 be destroyed on completion of the job and the last DBA DETACHes, Data Pump 311 destroys the table and makes transition 435 to UNDEFINED state 403; otherwise, if KEEP_MASTER indicates that master table 321 is to be kept on completion and the last DBA DETACHes, Data Pump 311 makes transition 436 to COMPLETED state 439. If a DBA ATTACHes in COMPLETED state 439, transition 430 occurs to COMPLETING state 433.

When the above state diagram is applied to Data Pump 311 as it executes the example export job of FIG. 19, it will be seen that that Data Pump 311 begins in UNDEFINED state 403, transitions on the OPEN call to DEFINING state 409, remains in that state until the START_JOB call is executed at 1911, transitions then to EXECUTING state 413, in which it remains until the STOP_JOB call at 1919 results in transitions from STOP PENDING 416 through STOPPING 417 to STOPPED 421. The ATTACH call at 1923 places Data Pump 311 in IDLING 425. In IDLING state 425, Data Pump 311 executes the calls at 1925 and 1927, and when Data Pump 311 executes START_JOB at 1929, Data Pump 311 makes the transition to EXECUTING state 413 and remains there until all of the objects have been transferred, at which point it makes the transition to COMPLETING 433 and from there to COMPLETED 439 or UNDEFINED 403, depending on the setting of KEEP_MASTER.

Details of a Preferred Embodiment

In the following, details of a preferred embodiment will be presented, beginning with a preferred embodiment of master table 321, continuing with the Application Program Interface (API) for a preferred embodiment of Data Pump 311, and concluding with a detailed description of the implementation of Data Pump 311 in a preferred embodiment.

Preferred Embodiment of Master Table 321. FIGS. 10-18

These figures present the definitions of all of the different kinds of master table rows 501 in a preferred embodiment. The definition for each row includes the non-null fields for that kind of row. There is a table in the figures for each kind of row. Each table has a row for each non-null field in that kind of row. The table rows have three columns: one giving the name of the field, one giving its data type, and one giving the field's meaning. For the most part, the tables are self-explanatory; where particular details need to be pointed out, reference numbers have been provided for that purpose.

Object Row 507: FIGS. 10-12

The reference numbers 507A, 507B, and 507C in FIGS. 10-12 identify the portions of the figures that show the non-null fields in object row 507. The outer level of brackets relates these fields to the classes of information shown in FIG. 5 for object row 507. Reference numbers inside the outer level of brackets refer to features of object row 507 that are of particular interest in the present context.

As already explained, there are one or more object rows 507 for each object that was exported or is to be imported in master table 321. In a preferred embodiment, table objects which do not contain metadata are treated specially. In the context of master table 321, such table objects are termed TABLE objects. A TABLE object always has at least two rows in master table 321, one representing the TABLE object itself, and at least one row representing the contents of the TABLE object. In the context of master table 321, objects which represent the contents of a TABLE object are termed TABLE_DATA objects. Fields which are of particular relevance to TABLE or TABLE_DATA objects are pointed out in the Meaning column of FIGS. 10-12.

With all objects, the value in process order field 503 identifies the object the row belongs to and the order in which it is to be processed relative to other objects having the same value in OBJECT_PATH_SEQ_NO 508; where there is more than one row for an object, duplicate field 504 identifies and orders the rows. Object dump file info 509 is implemented as shown at 1001: the dump file 323(*i*) in which the object's data resides is identified by dump file 323(*i*'s) dump file ID 902, the position at which the object's data begins in the dump file, the length in bytes of the object's data, and the number of blocks allocated in the dump file for the object.

The part of object processing information 513 which indicates the current state of processing for the object is indicated at 1003. Data Pump 311 reads these fields for objects that are currently being processed in response to a GET_STATUS call. The part of particular object info 511 which completely identifies the object is shown at 1005; included are the information needed to identify the object's metadata and the object itself in the source or destination database system.

Continuing with FIG. 1, COMPLETION_TIME 1101 is a timestamp that is used on an import operation to indicate the time at which the object was created in the destination database. IN_PROGRESS 1103 is used in an import operation to indicate whether the object creation was completely defined when the executing stage stopped. If the object represented by the row is dependent from another object, the other object is identified at 1104. When the object row represents a table object, 1105 indicates the maximum degree of parallelism with which the table object's data may be processed. Data Pump 311 computes the value for this field from information in the table's metadata when it makes the row. When the row represents a TABLE_DATA object, UNLOAD_METHOD 1107 indicates the method that Data Pump 311 uses to unload the row's object into the dump file on export or load the object from the file on import. Data Pump 311 computes the value for this field from the mode and remote link information received via the OPEN call and from the metadata for the object. The Direct Path and External Table methods will be described in detail later. GRANULES indicates the number of granules in the object being operated on. A granule is the unit of allocation for the object's data. SCN 111, finally is the system change number for the last transaction that altered the object. In an export operation, the SCN is used to maintain consistency between different partitions of the object being copied. In an import operation, the SCN is used to determine whether the imported object needs changes applied to it to make it a replica of an object on a remote DBMS.

Continuing with FIG. 12, object row 507C contains the remaining non-null fields in an object row. If the row represents a domain index object, the fields at 1201 identify the object. 1202 is used only for a grant object. The field specifies the user that made the grant object. In object rows for TABLE objects, XML_CLOB 1203 is a character large object that contains an XML representation of the TABLE object's metadata. During an export operation, the XML representation is stored in the object row when the row is made and is kept in the object row for easy access until the export operation is complete. When master table 321 is copied to the dump file, the XML representation is also copied to the dump file.

JOB_STATE Row 1205: FIGS. 12 and 13

JOB_STATE row 1205, shown at 1205A in FIGS. 12 and 1205B in FIG. 13, retains the parameters supplied on the OPEN call and provides the current state of the job. In an export operation, there is only one JOB_STATE row 1205 in master table 321; in an import operation from a dump file set, there are two JOB_STATE rows 1205, one from master table 321 for the import job and one from the dump file set's master table copy 325. 1205A and B show the non-null fields for this row. Those that are of particular interest in the present context are PROCESS_ORDER 503, which is for a non-object row and consequently has a negative value. As is the case for most of the non-object rows, the value depends on whether master table 321 has been made as part of an export or import job, as specified in the OPEN call that started the definition of the table. The information labeled 1207 comes from arguments supplied with the OPEN call that defines the master table. Other fields of interest are STATE 1213, which specifies the current state of the job the master table 321 belongs to. START_TIME 1215 is a date stamp that indicates when the OPEN call that began the job definition was made. DEGREE 1217 specifies the maximum degree of parallelism that may be used in the job. The value of the field is set by the DBA using a SET_PARALLEL call to Data Pump 311, which approaches the specified degree to the extent possible given the nature of the job and the resources available. ERROR_COUNT 1219 gives the total number of errors reported by Data Pump 311 thus far in performing the job.

In FIG. 13, the meaning of TOTAL_BYTES in an export job depends on when the field is given its value. At the beginning of the job, the value is an estimate of the total number of bytes that will be transferred in the job. Data Pump 311 makes the estimate by retrieving the metadata for the job and making the estimate from the information about the storage required for the objects in the metadata. The estimate is used by GET_STATUS to determine the percentage of the job which has been completed. When the job is completed, TOTAL_BYTES is set to the total number of bytes actually transferred. On import from a dump file set, TOTAL_BYTES is taken from master table copy 325 and is modified to reflect any filtering specified in master table 321.

MAX_PROCESS_ORDER Row 1303, FIG. 13

This row is used to coordinate parallel operations during an export job. As already pointed out, objects are processed as ordered by the values of the PROCESS_ORDER fields in the object rows 507 for the objects. The SEED field contains the largest PROCESS_ORDER value from the set of object rows 507 whose objects have already been or are currently being processed by Data Pump 311.

TYPE_COMPLETION Row 1305, FIG. 13

The TYPE_COMPLETION rows 1305 indicate the order in which the object types are processed and the current state of processing of objects of a particular type for a job. OBJECT_PATH_SEQ_NO field 1307 is used to sequence the object types in an import operation. It is the value of this field which appears in object type sequence field 508 in all of the object rows in table 321 for objects of the object type. Otherwise, TYPE_COMPLETION rows 1305 are part of job state info 517 and are used to restart a job. Restarting is done by restarting processing of objects of types currently being processed at the beginning of the processing for each of the types. OBJECT_TYPE_PATH specifies the object type represented by the row. If all of the objects of the type have been processed, COMPLETION_TIME indicates the time of completion and COMPLETED_ROWS indicates how many objects of the type have been processed. When an export operation is restarted, the object rows 507 for processed objects belonging to partially-processed types are returned to their state prior to being processed and are again processed. When an import operation is restarted, the information is used to ignore "object already exists" errors caused by writing objects to the importing DBMS that had been written earlier in the import operation.

FILE Row 1401

Each file in dump file set 323 has a FILE row 1401 (shown in FIG. 14) in master table 321. The value of DUPLICATE field 504 is used as the value of dump file ID 902 in the dump file's header and as the value of DUMP_FILE_ID field in object rows 507 whose objects are stored in the dump file represented by the FILE row 1401. This arrangement provides a way of identifying dump files within master table 321 which is independent of the names used for the dump files in the DBMS doing the export or import. The name of the file in the exporting or importing DBMS is specified at 1405 and its maximum size at 1407. The DBA can use an ADD_FILE call to cause Data Pump 311 to add FILE rows 1401 to master table 321 or can specify one or more templates for file names; in that case, Data Pump 311 generates file names using the templates and makes FILE rows 1401 for them as new files are needed in dump file set 323.

WILDCARD_FILE Row 1409

Continuing with FIG. 14, there is a WILDCARD_FILE row 1409 in master table 321 for each file template defined by the user in an ADD_FILE call. Non-null fields include the template (1411), the maximum size of files made using the template (1413), the last value used to make a file name from the template (1415,) and LAST_FILE 1417, which specifies the last file made using the template by the value of the DUPLICATE field in FILE row 1401 for the file.

WORKER Row 1501: FIG. 15

A preferred embodiment of Data Pump 311 uses a separate worker process to write data to or read data from each of the dump files 323 in the dump file set. The maximum number of worker processes is specified by the field DEGREE 1217 in JOB_STATE row 1205A. Each of the worker processes has a WORKER row 1501 in master table 321 whose fields contain current and cumulative information about the work the row's worker process has done. The information is used by Data Pump 311 in controlling the worker processes and is also used to compute restart status information 519. The WORKER rows thus belong to job state info 517.

A WORKER row 1501's worker process is identified by fields 504 and 1503; field 504 is an internal ID for the process; field 1503 contains the process's name. The fields indicated by 1505 identify the object the row's worker process is presently working on; the fields indicated by 1507 show the status of the work on the object currently being processed by the worker process.

TOTAL_BYTES is an estimate of the total size of the object currently being processed by the worker process represented by the row; the value is used by the GET_STATUS call to compute the percentage of the object that has been processed. The rows indicated by 1509, finally, indicate the cumulative work that the worker process has done since the last restart of the job and the time that the worker process has spent working on the job since the last START_JOB call. Data Pump 311 uses the information in the workers' rows to compute the overall state for the job.

RESTART_STATUS Row 1601: FIG. 16

Data Pump 311 uses RESTART_STATUS row 1601 to record information in area 1603 of the row from the JOB_STATE field TOTAL_BYTES 1301 and the WORKER row fields METADATA_IO, DATA_IO, and CUMULATIVE_TIME each time a restart operation is performed. There is only a single RESTART_STATUS row 1601 in master table 321. If no restart operation has been performed, the relevant fields for this row all contain the value 0. When GET_STATUS returns a report indicating how much total work has been done to date, the total work is computed by adding the current values of the WORKER row fields, METADATA_IO, DATA_IO, and CUMULATIVE_TIME to the current values of the corresponding fields of area 1603 of RESTART_STATUS row 1601.

RESTART_row 1605: FIG. 16

There is a RESTART row 1605 in master table 321 for each restart operation performed during an export or import job. Portion 1605 of the row contains copies of the values in the corresponding fields of RESTART_STATUS_ROW 1601 as of the time of the restart represented by RESTART row 1605; the value of ERROR_COUNT field 1606 is copied from the corresponding field 1219 of JOB_STATE row 1205A. Portion 1607 contains information about the environment of the job at the time of the stop that occasioned the restart operation represented by the row. Included are the location of the final message output by Data Pump 311 when the job stopped, the time that elapsed between the immediately preceding stop operation and the START_JOB call which preceded that stop operation, the starting time of the stopped job, and information about the system that was running the job when it was stopped. One advantage of the arrangement of RESTART rows in the prefered embodiment is that the DBA can simply compare RESTART rows to determine whether a job that has stopped, been restarted, and has stopped again has made any progress between stops.

FILTER Rows 1701 and 1709: FIG. 17

Each of these rows defines a filter for a set of objects in the export or import operation. The set may include all of the objects involved in the export or import operation. There is a separate row for each filter that is to be applied during the job. In an export operation or a fileless import operation, the filter is defined with regard to the set of objects as they are in the source database for the export operation. In an import operation that imports from a dump file, the filter is defined with regard to the objects as they are in the dump files. DATA_FILTER row 1701 defines a filter for a data object. Filter specification 1703 defines the filter. As seen at 1703, each filter has a name defined by Data Pump 311 and a specification of the set of objects to which the filter applies by schema and name. A value that is used in the filter is defined at 1705 and 1707; in the case of VALUE_T field 1705, the field may contain a subquery written in SQL.

METADATA_FILTER row 1709 defines a filter for a set of metadata objects; it works the same way as the row for data objects, except that there the definition of the filter will only involve text values, and the filter is applied to a set of metadata objects.

TRANSFORM Rows 1715

These rows define transforms and remaps to be applied to a set of metadata objects during an import operation. A transform does what its name implies: it gives each metadata object belonging to the set a different form. Transforms are typically used to suppress certain clauses in the creation DDL for an object. The new form of the object is specified in VALUE_N field 1721. A remap maps a name in the metadata object to a different name; when the object is imported, the name is replaced by the different name. OLD_VALUE 1719 specifies the name before the remap; VALUE_T specifies the name after the remap.

PARAMETER Rows 1801 and 1805: FIG. 18

The DBA may set parameters defined by Data Pump 311 that control how Data Pump 311 does an export or import job. Each of the parameters that have been set by the DBA or that have a default value has a PARAMETER row in master table 321. As shown at 1803, each row contains the name of its parameter, the parameter's default value if Data Pump 311 gives it one, and any non-default value the parameter has. Some parameters have text values, which are stored in the VALUE_T field and others have numeric values, which are stored in the VALUE_N field. There is a single NLS parameter row 1805. The row specifies globalization parameters. These parameters determine how character sets and field names are interpreted and thus permit the database management system to be adapted to different linguistic and cultural environments. The globalization parameters specified in the row are those that were in force on the database system that is the source of the data being exported at the time of the export operation. The parameters are specified at 1807 by a character string which is a DDL command that, when executed in the target database management system, will establish the NLS settings that the objects had in the source database. The NLS settings may be further qualified by NLS settings in the session of the user who made the OPEN call for the job.

A Presently-Preferred Embodiment of the Data Pump API: FIG. 21

FIG. 21 is a table 2101 listing all of the calls 2103-2129 of a presently-preferred embodiment of the Data Pump API. There is a row for each call, with the first column giving the call's name, the second the job states 403-439 of FIG. 4 that each of the calls may be made in, and the third containing a short description of the call. The table is self-explanatory. In addition, the calls of the API produce the following changes in master table 321:

| API | Effect on Master Table 321 |
|---|---|
| ADD_FILE | Adds a FILE or WILDCARD_FILE row to the master table |
| DATA_FILTER | Adds a DATA_FILTER row to the master table |
| METADATA_FILTER | Adds a METADATA_FILTER row to the master table |
| METADATA_REMAP | Adds a METADATA_TRANSFORM row to the master table |
| METADATA_TRANSFORM | Same |
| OPEN | On export: makes the JOB_STATE, MAX_PROCESS_ORDER, MASTER_TABLE (the object row for master table 321), RESTART_STATUS, and NLS_PARAMETERS; on import: makes the JOB_STATE, RESTART_STATUS, and NLS_PARAMETERS rows. |
| SET_PARALLEL | Sets the field DEGREE in the JOB_STATE row |
| SET_PARAMETER | Adds a PARAMETER row to the master table |

In the following, API calls that are of particular interest are discussed in more detail. Complete specifications of the API are given for OPEN and GET_STATUS.

SET_PARAMETER 2125

This call makes a PARAMETER row in master table 321. There are two calls: one for parameters with numeric values and one for parameters with character string values. In each case, the arguments are the handle for the job, the parameter name, and the parameter's value. Parameters that are of particular importance for the present discussion are:

- ESTIMATE_ONLY, which specifies that the job should produce an estimate of the size of the job, but not move any objects;
- KEEP_MASTER, which specifies whether master table 321 will be retained after normal completion of a job; and
- DATA_ACCESS_METHOD, which specifies a required unload or load method for the job; the three options are direct path, external table, and automatic; with automatic, Data Pump 311 chooses the load or unload method best suited to the object being loaded or unloaded. The methods are explained in detail later. automatic is the default value for the parameter.

SET_PARALLEL 2123

This call determines a maximum degree of parallelism that will be used in the job. During an export job, the number of dump files should be greater than or equal to the degree specified. The call has two arguments: the job handle and the degree of parallelism desired. Because this call determines the maximum number of resources the job may consume and thereby the speed with which the job is done, it may be termed herein the throttle for the job.

START_JOB 2127

This call begins or resumes execution of a job. The arguments are the handle for the job and a skip_current argument which is valid only for restarts of import jobs and which specifies that the work that was "in progress" when the job stopped be skipped. This is used to get around actions that cause fatal bugs in the import.

STOP_JOB 2129.

This call stops execution of a job. The arguments are the handle for the job, an argument indicating whether the stop is to be immediate, an argument indicating whether master table 321 is to be kept after the job is stopped, and a delay time to wait before forcibly detaching other users that are attached to the job. If a stop is immediate, the worker processes that are involved in the job are terminated immediately; otherwise, they are allowed to complete the item they are currently working on before they stop.

OPEN 2121

The complete API specification for OPEN follows:

```
FUNCTION open
(   operation          IN VARCHAR2,
    mode               IN VARCHAR2,
    remote_link        IN VARCHAR2 DEFAULT NULL,
    job_name           IN VARCHAR2 DEFAULT NULL,
    version            IN VARCHAR2 DEFAULT 'COMPATIBLE'
) RETURN NUMBER;
```

OPEN is used to declare a new job using the Data Pump API. The handle returned is used as a parameter for all other API calls except ATTACH.

Parameters operation—the type of operation to be performed. The valid operation types are:

| Operation | Description |
|---|---|
| EXPORT | Saves data and metadata to a dump file set or obtain an estimate of the data size of an operation. |
| IMPORT | Restores data and metadata from a dump file set or across a database link. |
| SQL_FILE | Displays the metadata from a dump file set or across a database link as a SQL script. The location of the SQL script is specified through the ADD_FILE API. |

mode—the scope of the operation to be performed. The valid modes are:

| Mode | Description |
|---|---|
| FULL | Operates on the full database or full dump file set except for the SYS, XDB, ORDSYS, MDSYS, CTXSYS, ORDPLUGINS, and LBACSYS schemas and some TBD portion of the XDB schema. |
| SCHEMA | Operates on a set of selected schemas. Defaults to the schema of the current user. All objects in the selected schemas are processed. Users cannot specify SYS, XDB, ORDSYS, MDSYS, CTXSYS, ORD-PLUGINS, or LBACSYS schemas for this mode. |
| TABLE | Operates on a set of selected tables. Defaults to all of the tables in the current user's schema. Only tables and their dependent objects are processed. |
| TABLESPACE | Operates on a set of selected tablespaces. No defaulting is performed. Tables which have storage in the specified tablespaces are processed parallel to what is done using a Table mode. |
| TRANSPORTABLE | Operates on metadata for tables (and their dependent objects) within aset of selected tablespaces to perform a transportable tablespace export/import. |

In the SCHEMA, TABLE, and TABLESPACE modes, the selected objects are specified by means of filter rows in master table 321. If specified as NULL, job_mode will default to FULL for Import and Sql_file operations. Specifying NULL for Export operations or networked Import operations will generate an error.

remote_link—If non-null provides the name of a database link to the remote database that will be the source of data and metadata for the current job. If null, the job will involve only the local DBMS. Combined with the OPERATION parameter, remote_link determines whether the job is an export job, an export job with a remote source, a fileless import job, or an import job from a dump file.

job_name—The name of the job. The name is limited to 30 characters. The name may consist of printable characters and spaces. It is implicitly qualified by the schema of the user executing OPEN and must be unique to that schema (i.e., there cannot be other active jobs using the same name). The name is used to identify the job both within the API and with other database components. The name supplied for the job will also be used to name the master table and other resources associated with the job.

version—the version of database objects to be extracted. This option is only valid for Export operations and networked Import and SQL_file operations. Database objects or attributes that are incompatible with the version will not be extracted. Legal values for this parameter are:

COMPATIBLE—(default) the version of the metadata corresponds to the database compatibility level and the compatibility release level for the featurer.

LATEST—the version of the metadata corresponds to the database version.

A specific database version.

Returns an opaque handle for the job. This handle is used as input to the SET_PARALLEL, ADD_FILE, DETACH, STOP_JOB, GET_STATUS, LOG_ENTRY, METADATA_FILTER, DATA_FILTER, METADATA_TRANSFORM, METADATA_REMAP, SET_PARAMETER and START_JOB calls.

Usage: Creates a job that is to be executed by the Data Pump API. A master table will be created for the job under the caller's schema within the caller's default tablespace. A handle referencing the job is returned that attaches the current session to the job. Once attached to the handle, the handle will remain valid until a detach even if the job finishes. The handle is only valid in the caller's session. Other handles may be attached to the same job via the ATTACH API.

GET_STATUS 2111

The complete API specification for this call follows:

```
FUNCTION get_status
    (   handle              IN NUMBER,
        mask                IN BINARY_INTEGER,
        timeout             IN NUMBER DEFAULT NULL
    ) RETURN ku$_Status;
```

There is also a procedural version of the GET_STATUS API which has two out values: ku$_status as above and job_state. The out values will be explained in the following.

GET_STATUS is used to monitor the status of a job or wait for the completion of a job.

Parameters:

handle—The handle of a job. The current session must have previously attached to the handle through an OPEN or ATTACH call.

mask—A bit mask to tell the interface which of four kinds of information to return in the ku$_Status object returned by the function. The four kinds of information are:

- WIP: CONSTANT BINARY_INTEGER:=1; Work in progress informational message.
- JOB_DESC: CONSTANT BINARY_INTEGER:=2; Complete job description including parameter values, dump file set members, etc.
- JOB_STATUS: CONSTANT BINARY_INTEGER:=4; Detailed job and progress status including per-worker process status.
- ERROR: CONSTANT BINARY_INTEGER:=8; Retrieve error information.

Multiple types of information can be requested by ORing together any combination of the above values. The actual types of information returned will be in the MASK attribute of the returned ku$_Status.

timeout—Maximum number of seconds to wait before returning to the user. An immediate return can be requested with a value of 0. An infinite wait can be requested with a value of −1. The API will return prior to the elapse of timeout seconds if WIP or ERROR information was requested and becomes available during the timeout interval. The timeout will be ignored when the job is in the COMPLETING or COMPLETED states.

Returns: A ku$_Status object is returned. The object looks like this:

```
CREATE TYPE sys.ku$_Status AS OBJECT
(
    mask                NUMBER,     /* Indicates which
                        status types are present*/
    wip                 ku$_LogEntry,    /* Work-In-
                        Progress: std. exp/imp msgs */
    job_description     ku$_JobDesc, /*Complete job
                        description */
    job_status          ku$_JobStatus,    /* Detailed job
                            status + per-worker sts */
    error               ku$_LogEntry /* Multi-level
                            contextual errors */
)
```

Out values: ku$_Status as above; job_state: current values of the fields in job state row 1205 for the job.

Usage

GET_STATUS is used to monitor the progress of an ongoing job and receive error notification. Various kinds of information can be requested via the mask parameter. JOB_DESC and JOB_STATUS are classified as synchronous information in that they can be handled directly by the client's shadow process. On the other hand, WIP and ERROR are classified as asynchronous: the messages that embody these types of information can be generated at any time by various layers in the Data Pump architecture.

- If synchronous information only is requested, the interface will always wait timeout seconds then return the requested information. This makes reporting periodic status every n seconds easy. Callers that want an immediate return should specify a timeout of 0.
- If asynchronous information is requested, the interface will wait a maximum of timeout seconds before returning to the client. If a message of the requested asynchronous information type is received, the call will complete prior to timeout seconds. If synchronous information was also requested, it will be returned whenever the API returns.

Error Handling

There are two types of error scenarios that are handled via GET_STATUS:

- Errors resulting from other API calls: For example, SET_PARAMETER may throw an INCONSISTENT_ARGS exception. The client should immediately call GET_STATUS with mask=8 (errors) and timeout=0. The returned ku$_Status.error will contain a ku$_LogEntry that describes in more detail what the inconsistency is.
- Errors resulting from events asynchronous to the client(s): An example might be 'Table already exists' when trying to create it. ku$_Status.error will contain a ku$_LogEntry with all error lines (from all processing layers that added context about the error) properly ordered. The collection can then just be walked first to last to output the information.

A client's main processing loop once the job is underway will most likely consist of a call to GET_STATUS with an infinite timeout (−1) "listening" for work-in-progress and error messages. If the user requested periodic status, then JOB_STATUS information will also be in the request with a fixed timeout value.

The ku$_Status is interpreted as follows in a preferred embodiment:

- ku$_Status.ku$_JobStatus.percent_done refers only to the amount of data that has been processed in a job. Metadata is not considered in the calculation.
- The caller should not use ku$_Status.ku$_JobStatus.percent_done for determining whether the job has completed. Instead, the caller should determine from the state of the job as found in ku$_Status.ku$job_status.state whether the job is in the COMPLETING or COMPLETED states.

Figure 22:
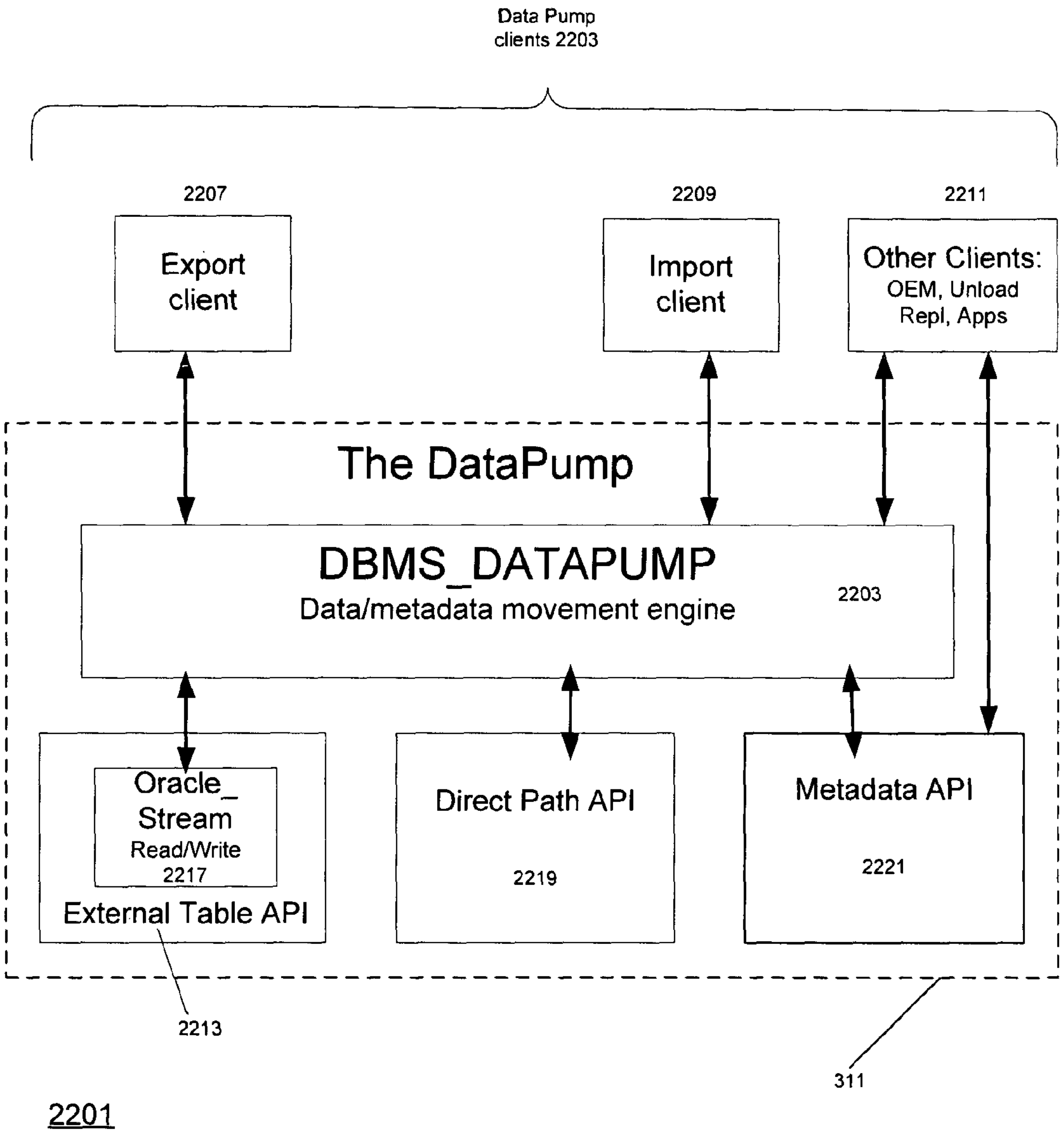
FIG. 22 is an overview of the environment in which Data Pump 311 operates.

Environment of Data Pump 311 in a Preferred Embodiment: FIG. 22

The primary task of Data Pump 311 is to move objects into or out of a database management system. Data Pump 311 may perform this task for a variety of clients, and in performing the task, Data Pump 311 takes advantages of data access services provided by other utilities in the Oracle data base management system in which Data Pump 311 is operating. FIG. 22 provides an overview of these clients and utilities and of their relationship to Data Pump 311.

Beginning with Data Pump clients 2203, these clients may specify operations of Data Pump 311 by means of the Data Pump API described above. Among the clients are the new Export and Import utilities made possible by Data Pump 311, and clients 2211 that are part of an Oracle DBMS system and make use of Data Pump 311 such as the Oracle Enterprise Manager, other Oracle utilities that use the API, and user application software that uses the API.

In moving objects, Data Pump 311 makes use of three Oracle utilities:

External tables 2213;

Direct Path load/unload 2219; and the DBMS_METADATA PL/SQL package 2221.

Data Pump 311 uses DBMS_METADATA package 2221 to move all metadata objects. With other objects, Data Pump 311 uses the object's metadata to determine which utility will provide the most efficient access method for moving the object's data and uses that method for the object. Data Pump 311 accesses all of the utilities by means of the utilities' APIs.

DPAPI 2219

Continuing in more detail concerning the utilities, DPAPI 2219 is the fastest single stream data movement technology provided in the Oracle DBMS; it is able to unload objects almost twice as fast as prior art export 101 and to load objects 15-40 times faster than prior art import 107 and almost twice as fast as the SQL*Loader. The DPAPI supports all Oracle data types except BFILES and opaque objects. DPAPI 2219 cannot, however, be used in all situations. Moreover, DPAPI 2219 does not take advantage of Data Pump 311's ability to process the objects being moved in parallel (though it does permit parallel processing of different objects or partitions within an object). Further, where DML transformations are required, it is not as flexible as External Tables 2213. For further details on DPAPI 2219, see Oracle 9i Database Utilities, Release 2, March 2002, Part No. A96652-01, Chapter 9, "Conventional and direct path loads".

External Tables 2213

External Tables 2213 will work for all cases, including those not handled by DPAPI 2219. External Tables 2213 has two components: Loader 2215, which loads objects into a database management system but does not unload objects from a DBMS, and Stream 2217, which does both. The preferred embodiment of data pump 311 uses Stream 2217 for transfers to or from dump files. External tables 2213 is very flexible. It can represent almost any external data source as an SQL row source, and once that is done, a load operation can be expressed merely as a CREATE TABLE external_table . . . ORGANIZATION EXTERNAL DDL statement followed by an INSERT INTO internal_table AS SELECT FROM external_table DML statement. An unload operation using external tables can be initiated with a single statement such as:

```
CREATE TABLE external_table . . . ORGANIZATION EXTERNAL
AS SELECT . . . FROM internal_table.
```

Though External Tables' single stream performance is somewhat less than DPAPI 2219, its relative slowness is made up for by the Data Pump's ability to process objects being moved in parallel. DPAPI 2219 also allows unlimited DML transformations and filtering using SQL. The External Tables access method is also extensible: New access drivers can be written and plugged into the External Tables infrastructure to support new data sources. Data Pump 311 takes advantage of External Tables' extensibility by employing a new access driver that unloads and loads tables using DPAPI 2219's high performance, binary stream format. This allows DPAPI 2219 to load streams written by External Tables 2213 and vice-versa for maximum flexibility. For more details on External Tables 2213, see Chapter 11 of the Utilities documentation cited above.

Metadata Package 2221

All metadata operations within the Data Pump are handled by DBMS_METADATA package 2221. DBMS_METADATA package 2221 provides an intuitive interface for the extraction and transformation of all database object definitions as either XML (if transformations are to be done in a downstream process as will be the case with export/import) or creation DDL. SQL DDL is generated by transforming the XML documents using native database XML/XSL services and XSL-T stylesheets stored in the dictionary. The package allows any number of transformations to be specified at both extraction and creation time. It also supports a number of canned transforms for DDL generation such as suppress storage clauses, suppress constraint definitions, etc. As used by Data Pump 311, DBMS_METADATA package 2221 includes the following enhancements:

Heterogeneous object support: This allows a caller to ask for metadata for a full database, a set of schemas or tablespaces, etc. All object definitions of all types are returned that meet the scope of the request. The definitions are returned in correct creation order.

Provision of XML documents for object creation with optional transformations specified.

Extraction of object definitions from a remote instance specified by a database link.

Complete support for all database object types.

For further details on DBMS_METADATA package 2221, see Chapter 15 of the Utilities documentation cited above. See also U.S. Ser. No. 09/672,914, George Claborn, et al., Aggregating and manipulating dictionary metadata in a database system, filed Sep. 28, 2000, and U.S. Ser. No. 10/014,038, Lee B. Barton, System having heterogenous object types, filed Oct. 10, 2001.

Figure 23:
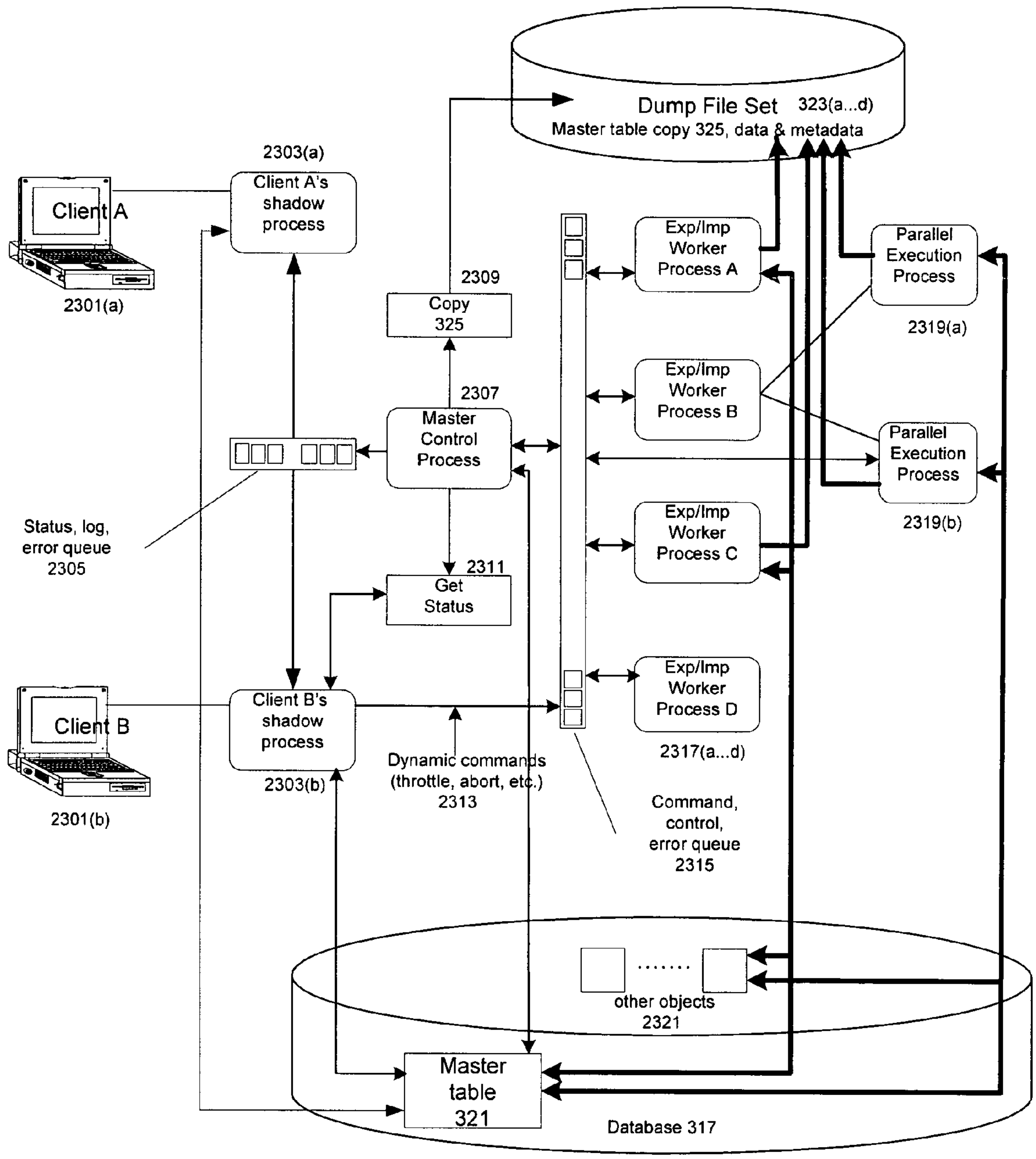
FIG. 23 shows the architecture of Data Pump 311 in a preferred embodiment.

Detailed Architecture of a Preferred Embodiment of Data Pump 311: FIG. 23

FIG. 23 is an architectural overview of DBMS_DATAPUMP 2203 as it is exporting database objects from database 317 to dump file set 323, which consists of four dump files 323(*a* . . . d). DBMS_DATAPUMP 2203 provides automatic, two-tiered parallelism for complex multi-table operations that move database objects. The first tier of parallelism is worker processes. At a given moment, each worker process is processing a different object, and a number of worker processes may execute in parallel. The second tier of parallelism is slave processes. If a worker process is processing an object whose data may be processed in parallel, the worker process may use slave processes to process the object. The maximum degree of parallelism is set using the SET_PARALLEL API.

A Master Control Process (MCP) 2307 is initiated for each Data Pump operation. The MCP is responsible for work sequencing, worker process management, communication with attached clients and dump file/log file management. In defining state 409 of the operation, MCP 2307 creates master table 321 and places entries in master table 321. In response to a START_JOB call, MCP 2307 creates the files in dump file set 323 and then creates a first tier pool of worker processes 2317. The worker processes actually perform the unloads and loads of data (sometimes via parallel slaves 2319) and metadata as well as update the Master Table as they complete work requests. The maximum number of worker processes and/or slave processes is determined by the degree of parallelism specified using the SET_PARALLEL call, but the degree of parallelism should in general not exceed the number of dump files. Here, there are four dump files, the specified degree is 4, and there are four processes writing to the dump file set: worker process 2317(*a*), worker process 2317(*c*), and worker process 2317(*b*)'s two slave processes 2319(*a*) and (*b*). Since the maximum degree of parallelism is 4, worker process 2317(*d*) is not in use. In the following, worker or slave processes that are writing to or reading from a dump file set or collecting the data to make the size estimate are termed active worker or slave processes. Each active worker or slave process loads objects to or unloads objects from a separate dump file 323(*i*), and the active worker or slave processes can thus operate across tables, partitions and metadata in parallel.

For data movement, MCP 2307 assigns each worker a partition or table (if unpartitioned) to load to the worker process's dump file. The worker process initially enumerates the table it is to load or unload and decides how the table should be loaded based upon the data types of its objects. It assigns one of four methods to the table: directpath, externaltable, either, or neither. Next the worker refines the assignment by considering the access type specified by the DATA_ACCESS_METHOD parameter and whether master table 321 has specified a filter for the object which involves a query clause. If such a filter has been specified, the external table method must be used. The refinement may cause the choice to be left at either or forced into a specific access method or to be set to neither if the requirements of the data type conflict layers conflict with the requirements of the DATA_ACCESS_METHOD parameter and the requirement for a query clause.

Finally, when the MCP generates the request to load/unload the object's data segment, it does not make the request if neither access method is appropriate. It preserves the access method if a specific access method is requested. If either was specified, it chooses the method that will lead to the earliest completion of the job: Normally, direct path (which is faster) is chosen. However, if a TABLE_DATA object is sufficiently large and a high degree of parallelism is enabled, the MCP will choose external table as the method. The MCP code for this final decision is:

```
IF (datasize < ((2* v_remaining_data) / v_degree))
    OR datasize < SCHEDULING_CLUMP)
  THEN ebug_log_text ('Direct path selected for next
    work item') ;
    method := KUPCC.MT_UNLOAD_DIRECT_PATH;
    parallel := 1;
  ELSE
    debug_log_text ('External table selected for
    next work item') ;
    method := KUPCC.MT_UNLOAD_EXTERNAL_TABLE;
END IF;
```

If MCP 2307 chooses External Tables, worker process 2317(*i*) may select from a pool of parallel slave processes 2319 that perform parallel query or DML operations. This provides a second tier of intra-partition parallelism within the Data Pump.

All communication between cooperating processes (client shadow processes, MCP, workers, parallel slaves) takes place in queues 2305 and 2315 that use the Advanced Queues technology of the Oracle 9i database management system. Advanced queues are asynchronous, have point-to-point and multicast capabilities, and work with clustered database management systems.

File operations are done in the Worker and parallel slave processes. Both worker and parallel slave processes will dynamically request files from the Data Pump's file management services. The file managers for these processes communicate with their counterpart in the MCP for centralized file synchronization. File assignment is "sticky"—a worker process does not relinquish a file unless requested by the file manager. Data Pump 2203's support for multiple directory specifications and file wildcarding permits easy creation and distribution of the dump file set across any I/O configuration.

Continuing in more detail with the operation of DBMS_DATAPUMP 2203 as shown in FIG. 23, Client A 2301(*a*) opens a session with DBMS 301. Opening the session creates the client's shadow process 2303(*a*). It is shadow process 2303(*a*) that makes the client's calls to Data Pump 311. To start the export operation, Client A's shadow process makes an OPEN call to Data Pump 311 to start an export operation. Data Pump 311 responds to the OPEN call by setting up queues 2305 and 2315 and master table 321 and then starting MCP 2307, which initializes master table 321 and returns a handle identifying this session's access to the export operation. Continuing with queues 2305 and 2315, queue 2315 is the command and control queue. All server processes comprising a Data Pump job (client shadow 2301, MCP 2307, workers 2317 and parallel slaves 2319) subscribe to this queue. The shadow processes send API requests to the MCP on this queue and the MCP in turn controls all the worker process via this queue. This is a bi-directional queue and the only one the MCP listens on. Status queue 2305 is used to send status, logging and error information to shadow processes 2303 that have clients attached to them. This queue is strictly unidirectional: The MCP posts status and errors and the client shadow processes consume them.

In defining state 409, client 2301(*a*) makes calls to various DBMS_DATAPUMP methods like SET_FILTER, SET_PARAMETER and ADD_FILE to establish parameter values like the maximum number of parallel streams, which files to use as dump files, schemas/tables to export, etc. Once all the parameters and filters are established, the client calls START_ JOB, which begins execution of the job. In this example, client 2301(*a*) has set the degree of parallelism to 4 and has set up four dump files 323(*a* . . . d) accordingly. MCP 2307 starts four worker processes which will subscribe to the command and control queue. MCP 2307 will at this time also create the four initial dump files of dump file set 323. As more space is needed as the job progresses, the dump files are extended. If more dump files are needed because no extensions are possible or because the DBA increased the maximum degree of parallelism, these files will automatically be created if wildcard template file specifications were provided by the client. In some embodiments, the user may be prompted for additional files as needed. Each file in the dump file set may hold all three kinds of required information: data from ordinary objects, XML representations of metadata objects, and directory/control information in the dump file header.

Once the worker processes 2317 have been initialized and have sent messages to MCP 2307 by queue 2315 requesting something to do, MCP 2307 directs one of the worker processes to initiate retrieval of metadata for one of the object types. The selected worker process will do so using heterogeneous object support within DBMS_METADATA package 2221. All metadata will be written to the dump file set as XML. This facilitates import's ability to effect transformations on the metadata prior to generating creation DDL. Object retrieval begins with the metadata table for the objects type for two reasons:

The metadata includes a size estimate of the partition so the MCP can sum them to get a total job size estimate.

Most important, it allows the MCP to immediately get other workers underway unloading data for objects of the type specified in the metadata table in parallel with metadata extraction.

As the metadata is retrieved, the worker process 2317(*i*) retrieving the metadata makes an object row 507 for each object described in the metadata. The object row 507 specifies the order in which the object is to be processed, location and size information about the object, and information about the granularity of the data in the object. When a worker process 2317(*j*) writes an object to worker process 2317(*j*)'s dump file 323(*j*) in dump file set 323, it writes the object to the dump file and then writes the object's object row 507.

As mentioned above, if the degree of parallelism specified in master table 321 is greater than one, fetching metadata and unloading data belonging to TABLE_DATA objects proceed in parallel. The total number of active worker processes plus active slave processes must always be no greater than the maximum degree of parallelism currently specified for the job. Each process that is operating in parallel writes to a separate dump file If wild cards have been specified for the job, Data Pump 311 creates new files as needed to achieve the maximum parallelism currently specified.

Unloads of TABLE_DATA objects in the export operation are ordered by size with the largest tables/partitions being unloaded first. If the DATA_ACCESS_METHOD parameter has the value "automatic", MCP 2307 determines on a per-partition basis which data access method to use for the TABLE_DATA object, DPAPI 2219 or External Tables 2213. Multiple partitions may be sent in a single work item to a worker process in order to provide a significant chunk of work per request. MCP 2307 sends the unload request to the next available worker process unless that would cause Data Pump 2203 to exceed the degree of parallelism currently specified for the job. The worker process uses the data access method specified by MCP 2307 to make the request. If External Tables is the chosen access method, a DDL statement such as the following will be generated to initiate the external table unload:

```
CREATE TABLE foo_ext (. . .) ORGANIZATION EXTERNAL . . . AS
SELECT . . . FROM foo_int
```

If the degree of parallelism specified by the throttle has not yet been exceeded, a worker process that employs the External Tables access method may use as many slave processes as the degree of parallelism permits to process the object in parallel.

In FIG. 23, worker process 2317(*b*) is unloading a TABLE_DATA object using External Tables 2213. The resources available in the exporting system permit worker process 2317(*b*) to use two slave processes 2319(*a* and b) to do the unloading. Worker process 2317(*b*) has taken the two slave processes from the pool of slave processes maintained by MCP 2307 and is coordinating their activities. While this is going on, worker process 2317(*a*) is continuing to unload metadata and worker process 2317(*c*) is unloading another TABLE_DATA object using Direct Path API 2219. Since four streams of unload are currently active (the maximum currently permitted by the throttle), worker process D is temporarily idle. Regardless of which unload method is used, the worker process 2317(*i*) or one of its slave process 2319 puts each chunk of row data into DPAPI stream format and unloads it into the worker process's dump file 323(*i*) at a file and byte offset provided by the file management layer of MCP 2307. Only one worker or slave process writes to a given dump file at a time. If a file fills, the process obtains a file extension from MCP 2307's file manager. If the file is not extendible, the file manager will return a new file to the worker if it is able to do so. If not, Data Pump 311 stops the job. Once the problem has been solved, the job may be restarted as described above. The worker processes 2317 and the master control process 2307 communicate via queue 2315. Messages sent via the queue post progress, request additional file space, report errors, and so forth. MCP 2307 writes work-in-progress information to queue 2305, where it is available to shadow processes 2303. Each worker process writes its status information to the worker process's row 1501 in master table 321. A shadow process 2303 may make a GET_STATUS call on behalf of its client 2301 to retrieve this information from master table 321.

Parallelism in Import Jobs that use Dump Files

The use of parallelism in import jobs from dump files is limited by the fact that an object must be created in the DBMS 301 into which the object is being imported before the object's data can be loaded. In such an import job, Data Pump 311 simply works through master table 321's object rows 507 in the order specified by fields 508, 503, and 504. Since that is so, objects belonging to a given type are processed together and TABLE_DATA objects are processed by decreasing size. For each object, the metadata for the object's type in the dump files is used to make the creation DDL for the object, and that is used to create the object in DBMS 301. When the object has been created in DBMS 301, the data for the object is copied from the dump file to the object in DBMS 301. Where the benefits of parallelism outweigh the costs of setting it up, parallel processing may be used to copy the data for large objects from dump file set 323 to DBMS 301. The fact that the method used to unload a TABLE_DATA object is recorded in field 1107 of its object row 507 makes determination of the benefits of parallelism easier.

Parallelism with Remote Sources of Objects

As described with regard to FIG. 24, where the source of objects for an export operation or a fileless import operation is remote from the DBMS upon which Data Pump 311 is executing, the metadata for each object to be fetched from the source is first obtained from the source and then used to make a query to the source which fetches the object's data from the source. In the case of export, the object's metadata or data is written to dump file set 323. In the case of fileless import, the object's metadata is used to create the object in the DBMS upon which Data Pump 311 is executing and then the object's data is written to the newly-created object. Parallelism may be achieved in both cases by means of a number of worker processes. Each worker process has its own link to the remote source and retrieves objects via the link as just described. Here, too, of course, a worker process may use slave processes where it makes sense to write an object's data to the dump file set or to the destination DBMS.

Advantages of Master Table 321

As is apparent from the foregoing, the ease of use, flexibility, and speed of Data Pump 311 are greatly enhanced by the use of master table 321 in DBMS 301 in which Data Pump 311 is executing to represent the job. As a table in DBMS 301, master table 321 provides a persistent representation of the job upon which any operation that can be done on a table in DBMS 301 can be performed. Master table 321 includes the following information:

- a complete description of the job: the objects to be transferred, their sources and destinations, the operations to be performed on the objects in the course of the transfer, parameters governing the transfer.

a complete description of the current state of the job, including what objects have been transferred to that point and the order in which they have been transferred and the information needed to restart the job at that point.

As a persistent description of the job, master table 321 is available to define the job before it starts executing, while the job is executing, while the job is stopped, and after it is completed. It is independent of the session in which it was created and interested clients may use master table 321 to access information about the job at any time during its existence. The persistence of mater table 321 and the information it contains thus make the following possible:

Clients may attach to or detach from the job at any time during its existence.

While a job is executing, detachment of the last client from the job does not halt the job.

An attached client may obtain detailed status information about the job until it is completed.

An attached client can control the behavior of an executing job.

The client can stop the job and can restart a job that was stopped by a client or by an error.

The client can control the amount of resources available to the job.

The information that was collected and written to master table 321 during an export operation is easily available to the corresponding import operation and can be used to increase the speed and efficiency of the import operation.

Because master table 321 is a database table in the DBMS doing the job, the following is possible:

Master table 321 is easily accessible to Data Pump 311 and its clients throughout the life of the job.

New information about the job may be added to the table simply by adding a row.

The rows may be accessed in any order and in parallel.

Operations on master table 321 are under DBMS 301's transaction control system.

Data pump 311 may easily obtain information from master table 321 by querying the table.

If a subset of the export job is to be imported, the filter to obtain the subset may be applied to master table 321 rather than to the dump file.

CONCLUSION

The foregoing Detailed Description has disclosed to those skilled in the relevant technologies how to make and use a system for transferring objects between DBMS's that operates under a control database object in the DBMS performing the transfer and has further disclosed the best mode presently known to the inventors of making and using their system. It will be immediately apparent to those skilled in the relevant technologies that the techniques disclosed herein are not restricted to the particular relational database management system in which they are implemented or indeed to relational database management systems at all, but can be used in any kind of database management system. It will be further apparent that many of the particular techniques used in implementing the system are determined by characteristics of the Oracle 9i database system such as the utilities available for retrieving metadata and moving objects, and that even in the Oracle 9i environment, many other ways of implementing the system are possible. Since that is the case, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. Apparatus in a database management system for performing a job which transfers a set of database objects into or out of the database management system, the apparatus comprising:

a transfer mechanism that transfers the set of database objects; and a queryable control database object that represents the job and specifies the set of database objects, wherein the transfer mechanism operates under control of the queryable control database object to transfer the database objects in the set.

2. The apparatus set forth in claim 1 wherein:

the queryable control database object further specifies an order in which the transfer mechanism transfers the database objects in the set.

3. The apparatus set forth in claim 2 wherein:

the order orders the database objects in the set by size.

4. The apparatus set forth in claim 1 wherein:

the queryable control database object includes a filter that further specifies the set of database objects.

5. The apparatus set forth in claim 1 wherein:

the transfer mechanism further performs an operation on one or more database objects belonging to the set; and the queryable control database object includes a specification of the operation.

6. The apparatus set forth in claim 5 wherein:

the operation comprises a transforming operation that transforms the database object.

7. The apparatus set forth in claim 6 wherein:

the operation comprises a remapping operation that remaps a name in the database object to a different name.

8. The apparatus set forth in claim 1 wherein:

the queryable control database object includes a specification of a status of the job; and the transfer mechanism updates the status in the specification during a transfer.

9. The apparatus set forth in claim 8 wherein:

the queryable control database object is queryable to obtain a current status of the job from the specification of the status.

10. The apparatus set forth in claim 8 wherein:

the transfer mechanism employs the specification of the status of the job to restart the job after the job has been stopped.

11. The apparatus set forth in claim 1 wherein:

the queryable control database object specifies a remote database management system as a source of the set of objects; and the transfer mechanism fetches the set of database objects from the remote database management system.

12. The apparatus set forth in claim 11 wherein:

the queryable control database object specifies the database management system as a destination of the set of database objects; and the transfer mechanism further fetches the set of database objects into the database management system.

13. The apparatus set forth in claim 1 wherein:

the control database object specifies a set of files in the database management system as a source or destination of the set of database objects.

14. The apparatus set forth in claim 13 wherein:

when the set of files is the source of the set of database objects, the set of files is a result of the job and includes a copy of the control database object for the job.

15. The apparatus set forth in claim 13 wherein:

the queryable control database object comprises a table and includes rows representing the database objects belonging to the set of database objects.

16. The apparatus set forth in claim 15 wherein:

each row representing a database object belonging to the set includes a specification of an order in which the database object represented by the row is to be transferred from the set of files relative to other objects belonging to the set.

17. The apparatus set forth in claim 15 wherein:

when the set of files is the destination of the set of database objects, there is a row representing each object that has been transferred to the set of files.

18. The apparatus set forth in claim 15 wherein:

when the set of files is the source of the set of database objects, there is a row representing each object which is to be transferred into the database management system.

19. The apparatus set forth in claim 18 wherein:

the row representing a particular object includes a field whose value specifies an order in which the object is to be transferred relative to other objects in the set of database objects.

20. The apparatus set forth in claim 15 wherein:

the set of files comprises a result of the job and includes a copy of the queryable control database object for the job, the copy having a row for each database object in the set of files; and when the transfer mechanism is transferring the database objects belonging to the set of database objects from the set of files into the database management system, the queryable control database object includes a copy of at least the rows representing the database objects from the copy of the queryable control database object in the set of files.

21. The apparatus set forth in claim 15 wherein:

a row in copied rows representing a particular object includes a field whose value specifies an order in which the particular object is to be transferred relative to other objects represented by remaining copied rows of the copied rows.

22. The apparatus set forth in claim 13 wherein:

the queryable control database object further specifies a template, whereby the transfer mechanism adds a file to the set of files when required for transferring the database objects.

23. The apparatus set forth in claim 1 wherein:

the queryable control database object specifies a remote database management system as a source of the set of database objects and a set of files in the database management system as a destination therefor; and the transfer mechanism transfers the set of database objects from the remote database management system to the set of files.

24. The apparatus set forth in claim 1 wherein:

the queryable control database object specifies a set of files in the database management system as a source of the set of database objects; and the transfer mechanism transfers the set of database objects from the set of files into the database management system.

25. The apparatus set forth in claim 1 wherein:

the transfer mechanism further provides an interface through which an entity that uses the transfer mechanism interacts with the job.

26. The apparatus set forth in claim 25 wherein:

the interface permits the entity to attach to and detach from the job for as long as the queryable control database object for the job exists, transfer of the database objects by the transfer mechanism being unaffected by detachment of the entity from the job.

27. The apparatus set forth in claim 25 wherein:

the entity uses the interface via a network connection to the database management system.

28. The apparatus set forth in claim 25 wherein:

the interface includes a defining interface through which the entity defines a portion of the queryable control database object for the job.

29. The apparatus set forth in claim 25 wherein:

the interface includes an executing interface through which the entity interacts with the transfer mechanism from a time the transfer mechanism begins transferring the database objects in the set until the queryable control database object for the job ceases to exist.

30. The apparatus set forth in claim 29 wherein:

the entity uses the executing interface to obtain a current status of the job from a specification of a status of the job in the queryable control database object.

31. The apparatus set forth in claim 26 wherein:

the entity uses the executing interface to stop performance of the job by the transfer mechanism or the transfer mechanism stops the performance of the job in response to an error.

32. The apparatus set forth in claim 31 wherein:

the entity uses the executing interface to restart a stopped job, the transfer mechanism using a specification of a status of the job in the queryable control database object to restart the stopped job.

33. The apparatus set forth in claim 29 wherein:

the entity uses the executing interface to affect allocation of resources by the transfer mechanism to the job.

34. The apparatus set forth in claim 33 wherein:

the transfer mechanism operates on the database objects in the set in parallel; and the entity uses the executing interface to specify a maximum degree of parallelism for the job.

35. A computer program product comprising a non-transitory computer readable medium having stored thereupon a sequence of instructions which, when executed by at least one processor, causes the at least one processor to perform a method for transferring a set of database objects into or out of a database management system with a set of files, the method comprising:

identifying a job to transfer the set of database objects; and performing the job by using the set of files and at least a transferring mechanism, wherein the set of files comprises:

at least one file including the set of database objects; and a queryable control database object included in one file belonging to the set of files that specifies for each database object belonging to the set of database objects a location of the each object in the set of files and an order in which the database management system transfers the each object during a transfer.

36. The set of files set forth in claim 35 wherein:

the one file further includes metadata that defines a type of database objects and one or more database objects that belong to the type defined by the metadata; and the order determines that the metadata is processed before the one or more database objects that belong to the type defined by the metadata.

37. The set of files set forth in claim 35 further comprising:

a header in each file of the set of files, the header including an indication that a control object is included in the each file, and if so, a location of the control object in the each file and an identifier that identifies the each file within the set of files; and the control object uses the identifier in specifying the location of the each object in the set of files.

38. A computer implemented method of performing a job that transfers a set of database objects into or out of a database management system that includes a transfer mechanism that transfers the set of database objects, the method comprising:

using at least one processor of a computing system to perform a process, the process comprising:

defining a queryable control database object that represents the job and specifies the set of database objects; and executing the job by causing the transfer mechanism to transfer the set of database objects under control of the queryable control data base object.

39. The computer implemented method of performing the job set forth in claim 38, the process further comprising an act, which is performed in either the act of defining the queryable control database object or an act of executing the job, of:

attaching to the job, attachment permitting at least reading and/or modification of the queryable control database object for the job.

40. The computer implemented method of performing the job set forth in claim 39, the process further comprising an act, which is performed after the act of attaching to the job, of:

reading the queryable control database object for the job to get a current status for the job.

41. The computer implemented method of performed the job set forth in claim 39, wherein the transfer mechanism transfers the data objects in parallel, and the process further comprises an act, which is performed after the act of attaching to the job, of:

specifying a degree of parallelism with which the set of database objects is transferred.

42. The computer implemented method of performing the job set forth in claim 39, wherein the process further comprises an act, which is performed after the act of attaching to the job, of:

starting the act of executing the job.

43. The computer implemented method of performing the job set forth in claim 39, wherein the process further comprises an act, which is performed after the act of attaching to the job, of:

stopping the act of executing the job.

44. The computer implemented method of performing a job set forth in claim 43, wherein the act of stopping the act of executing the job further comprises:

saving a job state in the queryable control database object such that the act of executing the job is restarted from the job state.

45. The computer implemented method of performing the job set forth in claim 38 wherein:

the act of defining the job includes creating the queryable control database object for the job.

46. The computer implemented method of performing job set forth in claim 38 wherein:

the act of defining the job includes specifying a source and/or destination for the set of database objects in the queryable control database object for the job.

47. The computer implemented method of performing job set forth in claim 38 wherein:

the act of defining the job includes specifying a filter in the queryable control database object for the job, the filter defining a subset of the set of database objects, which has been specified, as the set of database objects to be transferred in the job.

48. The computer implemented method of performing job set forth in claim 38 wherein:

the act of defining the job includes specifying an operation in the queryable control database object for the job that is to be performed on one or more objects in the set.

49. The computer implemented method of performing job set forth in claim 38 wherein:

the act of defining the job includes defining a parameter for the job in the queryable control database object for the job.

50. The computer implemented method of performing job set forth in claim 38, wherein:

the act of executing the job includes an act, which is performed when the step of executing the job must be stopped, of:

saving a job state in the queryable control database object such that the act of executing the job, which has been stopped, is restarted from the job state.

51. The computer implemented method of performing job set forth in claim 50, wherein the act of executing the job includes an act, which is performed when the act of executing the job has been stopped, of:

using the job state to restart the act of executing the job, which has been stopped.

52. The apparatus set forth in claim 1 wherein:

the queryable control database object includes a specification of one or more parameters for the job, the transfer mechanism transferring the database objects in the set as specified by the one or more parameter.

53. The apparatus set forth in claim 52 wherein:

the one or more parameter comprises an estimate only parameter, the transfer mechanism responding thereto by providing an estimate of a space required for the database objects in the set without transferring the database objects.

54. The apparatus set forth in claim 1 wherein:

the queryable control database object comprises a table and includes rows representing the database objects belonging to the set of database objects.

55. The apparatus set forth in claim 54 wherein:

a row representing a particular object includes a field whose value specifies an order in which the particular object is to be transferred relative to other objects.

56. A data storage device characterized in that:

the data storage device contains code which, when executed by a processor, implements the apparatus set forth in claim 1.

57. A data storage device characterized in that:

the data storage device stores the sequence of instructions set forth in claim 35.

58. A data storage device characterized in that:

the data storage device includes code which, when executed by a processor, implements the method set forth in claim 38.

* * * * *

UNITED STATES PATENT AND TRADEMARK OFFICE

CERTIFICATE OF CORRECTION

PATENT NO. : 8,341,120 B2
APPLICATION NO. : 10/656525
DATED : December 25, 2012
INVENTOR(S) : Barton et al.

It is certified that error appears in the above-identified patent and that said Letters Patent is hereby corrected as shown below:

On Title page, in column 2, under "Abstract", line 12, delete "may also" and insert -- may --, therefor.

In the Drawings:

On sheet 6 of 24, in figure 6, Reference Numeral 605, line 7, delete "tranforms" and insert -- transforms --, therefor.

On sheet 6 of 24, in figure 6, Reference Numeral 607, line 2, delete "executionof" and insert -- execution of --, therefor.

In the Specifications:

In column 8, line 59, delete "sunique" and insert -- unique --, therefor.

In column 8, line 60, delete "and and" and insert -- and --, therefor.

In column 16, line 22, delete "1," and insert -- 11, --, therefor.

In column 18, line 24, delete "(1415,)" and insert -- (1415), --, therefor.

In column 21, line 4, delete "automatic" and insert -- Automatic --, therefor.

In column 21, line 23, delete "2129." and insert -- 2129 --, therefor.

In column 22, line 20, delete "aset" and insert -- a set --, therefor.

In column 24, line 53-54, delete "ku$_Status.ku$job_status.state" and insert -- ku$_Status.ku$_job_status.state --, therefor.

Signed and Sealed this
Twenty-first Day of May, 2013

Teresa Stanek Rea
*Acting Director of the United States Patent and Trademark Office*

In the Claims:

In column 35, line 23, in Claim 38, delete “data base” and insert -- database --, therefor.